(12) United States Patent
Kumagai et al.

(10) Patent No.: US 12,526,787 B2
(45) Date of Patent: Jan. 13, 2026

(54) TERMINAL, BASE STATION AND COMMUNICATION METHOD

(71) Applicant: NTT DOCOMO, INC., Tokyo (JP)

(72) Inventors: Shinya Kumagai, Tokyo (JP); Satoshi Nagata, Tokyo (JP); Qiping Pi, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 425 days.

(21) Appl. No.: 18/039,844

(22) PCT Filed: Dec. 18, 2020

(86) PCT No.: PCT/JP2020/047543
§ 371 (c)(1),
(2) Date: Jun. 1, 2023

(87) PCT Pub. No.: WO2022/130645
PCT Pub. Date: Jun. 23, 2022

(65) Prior Publication Data
US 2024/0023081 A1    Jan. 18, 2024

(51) Int. Cl.
*H04W 72/11*    (2023.01)
*H04L 1/1829*    (2023.01)
*H04L 5/00*    (2006.01)

(52) U.S. Cl.
CPC ........... *H04W 72/11* (2023.01); *H04L 1/1854* (2013.01); *H04L 5/0055* (2013.01)

(58) Field of Classification Search
CPC ..... H04W 72/11; H04L 5/0055; H04L 1/1854
See application file for complete search history.

(56) References Cited

U.S. PATENT DOCUMENTS

| | | | | |
|---|---|---|---|---|
| 10,841,881 B2* | 11/2020 | Ouchi | ................ | H04W 52/325 |
| 11,601,222 B2* | 3/2023 | Lee | ...................... | H04L 1/1896 |
| 11,997,682 B2* | 5/2024 | Choi | ..................... | H04L 1/1812 |
| 2020/0359401 A1 | 11/2020 | Yoshimura et al. | | |

(Continued)

FOREIGN PATENT DOCUMENTS

JP    2019-121977 A    7/2019

OTHER PUBLICATIONS

International Search Report issued in PCT/JP2020/047543 on Jul. 27, 2021 (5 pages).

(Continued)

*Primary Examiner* — Raj Jain
(74) *Attorney, Agent, or Firm* — Osha Bergman Watanabe & Burton LLP

(57) ABSTRACT

A terminal includes: a reception unit configured to receive data according to SPS (Semi persistent scheduling) from a base station; a control unit configured to determine HARQ-ACK (Hybrid automatic repeat request Acknowledgement) feedback information corresponding to the data, wherein transmission of the HARQ-ACK feedback information is required to be postponed until a valid uplink resource is found, configure a HARQ-ACK codebook related to the feedback information, and determine bits of the feedback information by applying the codebook; and a transmission unit configured to transmit the feedback information to the base station. The control unit configures the codebook based on priorities configured to the bits.

6 Claims, 21 Drawing Sheets

(56) References Cited

U.S. PATENT DOCUMENTS

2022/0014337 A1* 1/2022 Ouchi .............. H04W 74/0808
2022/0046677 A1* 2/2022 Talarico ................ H04W 72/23
2023/0188301 A1* 6/2023 Ma ............................ H04L 1/16
2024/0023081 A1* 1/2024 Kumagai .................. H04L 1/00

OTHER PUBLICATIONS

Written Opinion of the International Searching Authority issued PCT/JP2020/047543 on Jul. 27, 2021 (3 pages).
Qualcomm Incorporated; "UCI Enhancements for eURLLC"; 3GPP TSG-RAN WG1 #98, R1-1909265; Prague, Czech Republic; Aug. 26-30, 2019 (22 pages).
3GPP TS 38.213 V16.3.0; "3rd Generation Partnership Project; Technical Specification Group Radio Access Network; NR; Physical layer procedures for control (Release 16)"; Sep. 2020 (179 pages).
3GPP TS 38.331 V16.2.0; "3rd Generation Partnership Project; Technical Specification Group Radio Access Network; NR; Radio Resource Control (RRC) protocol specification (Release 16)"; Sep. 2020 (921 pages).
Office Action issued in Japanese Application No. 2022-569685, mailed Jan. 7, 2025 (6 pages).
Nokia, Nokia Shanghai Bell: "HARQ-ACK Feedback Enhancements for URLLC/IIoT"; 3GPP TSG RAN WG1 #103-e, R1-2008842; e-Meeting, Oct. 26-Nov. 13, 2020 (14 pages).
Panasonic: "Discussion on UE feedback enhancements for HARQ-ACK"; 3GPP TSG RAN WG1 #103-e, R1-2008952; e-Meeting, Oct. 26-Nov. 13, 2020 (4 pages).

* cited by examiner

TERMINAL, BASE STATION AND COMMUNICATION METHOD

FIELD OF THE INVENTION

The present invention relates to a terminal, a base station and a communication method in a wireless communication system.

BACKGROUND OF THE INVENTION

In 3GPP (3rd Generation Partnership Project), in order to realize further larger system capacity, further faster data transmission speed, further lower latency in a wireless communication section, etc., a wireless communication method called "5G" or "NR (New Radio)" has been discussed (hereinafter, the wireless communication method is referred to as "NR"). In 5G, various wireless technologies and network architectures are being discussed to satisfy the requirements of a radio link delay of 1 ms or less while achieving throughput of 10 Gbps or more.

In addition, in NR, a downlink SPS (Semi-Persistent Scheduling) is specified in which PDSCH (Physical Downlink Shared Channel) resources are configured in advance for a terminal and activation/release is performed by DCI (Downlink Control Information), which enables low-latency data reception (For example, non-patent references 1 and 2).

CITATION LIST

Non-Patent Document

[Non-Patent Document 1] 3GPP TS 38.213 V16.3.0 (2020 September)
[Non-Patent Document 2] 3GPP TS 38.331 V16.2.0 (2020 September)

SUMMARY OF THE INVENTION

Technical Problem

When PDSCH is scheduled by SPS for multiple consecutive DL (Downlink) slots, PUCCH (Physical Uplink Control Channel) for transmitting HARQ-ACK (Hybrid automatic repeat request Acknowledgement) corresponding to the PDSCH reception may collide with DL symbols or flexible symbols.

As a result, a process of postponing the HARQ-ACK transmission until a timing of the next available PUCCH is assumed. However, it is unclear how to configure the HARQ-ACK codebook when HARQ-ACK transmission is delayed.

In view of the above, the present invention has been made to enable a terminal receiving data from a base station to transmit feedback information corresponding to the reception of the data to the base station.

Solution to Problem

According to the disclosed technology, a terminal is provided. The terminal includes: a reception unit configured to receive data according to SPS (Semi persistent scheduling) from a base station; a control unit configured to determine HARQ-ACK (Hybrid automatic repeat request Acknowledgement) feedback information corresponding to the data, wherein transmission of the HARQ-ACK feedback information is required to be postponed until a valid uplink resource is found, configure a HARQ-ACK codebook related to the feedback information, and determine bits of the feedback information by applying the codebook; and a transmission unit configured to transmit the feedback information to the base station. The control unit configures the codebook based on priorities configured to the bits.

Advantageous Effects of Invention

According to the disclosed technology, a technology is provided that enables a terminal receiving data from a base station to transmit feedback information corresponding to the reception of the data to the base station.

DETAILED DESCRIPTION OF THE PREFERRED EMBODIMENTS

Figure 1:
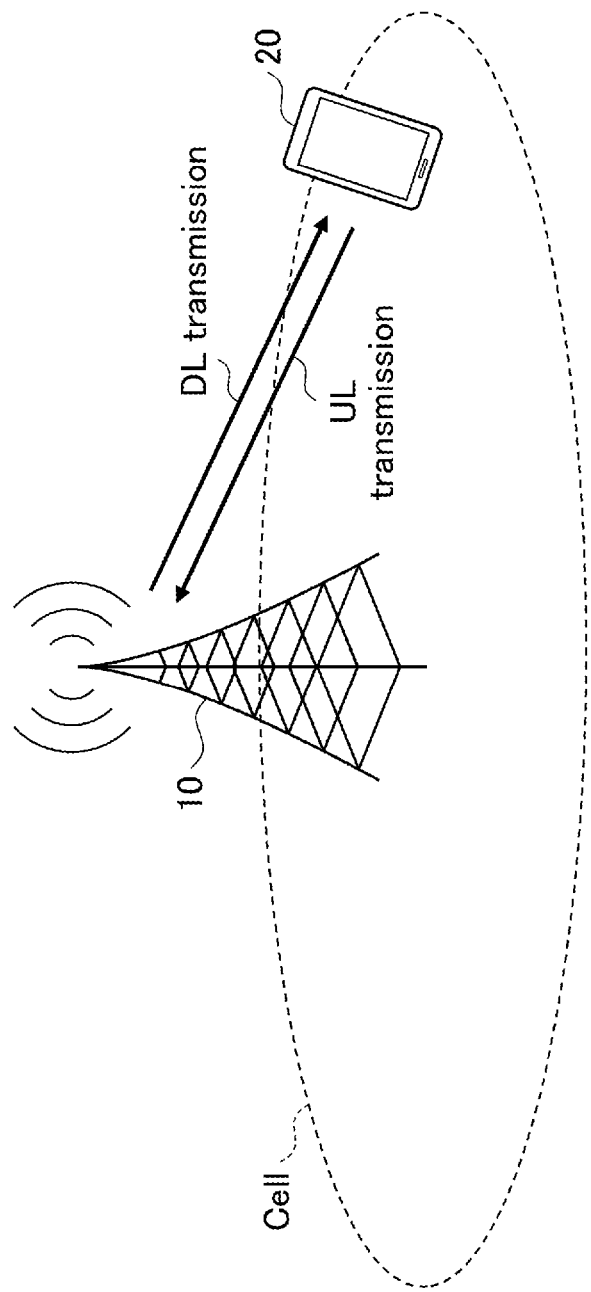
FIG. 1 is a drawing illustrating a wireless communication system according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Furthermore, in one or more embodiments described below, terms that are used in the existing LTE are used, such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), etc. The above-described terms are used for the sake of description convenience. Signals, functions, etc., which are similar to the above-described terms, may be referred to as different names. Further, terms, which are used in NR and correspond to the above-described terms, are NR-SS, NR-PSS, NR-SSS, NR-PBCH, NR-PRACH, etc. However, even when a signal is used for NR, there may be a case in which the signal is not referred to as "NR-".

In addition, in an embodiment of the present invention, the duplex method may be a TDD (Time Division Duplex) method, an FDD (Frequency Division Duplex) method, or any other method (e.g., Flexible Duplex, or the like).

Further, in an embodiment of the present invention, the expression, radio (wireless) parameters are "configured (set)" may mean that a predetermined value is pre-configured, or may mean that a radio parameter indicated by the base station 10 or the terminal 20 is configured.

FIG. 1 is a drawing illustrating a wireless communication system according to an embodiment of the present invention. As illustrated in FIG. 1, a wireless communication system according to an embodiment of the present invention includes a base station 10 and a terminal 20. In FIG. 1, a single base station 10 and a single terminal 20 are illustrated as an example. There may be a plurality of base stations 10 and a plurality of terminals 20.

The base station 10 is a communication device that provides one or more cells and performs wireless communications with the terminal 20. Physical resources of radio signals may be defined in the time domain and the frequency domain, the time domain may be defined by the number of OFDM (Orthogonal Frequency Division Multiplexing) symbols, and the frequency domain may be defined by the number of sub-carriers or resource blocks. In addition, a TTI (Transmission Time Interval) in the time domain may be a slot or a sub-slot, or the TTI may be a subframe.

The base station 10 can perform carrier aggregation to communicate with the terminal 20 by bundling a plurality of cells (multiple CCs (component carriers)). In carrier aggregation, one primary cell (PCell) and one or more secondary cells (SCells) are used.

The base station 10 transmits a synchronization signal, system information, and the like, to the terminal 20. The synchronization signal is, for example, an NR-PSS and an NR-SSS. The system information may be transmitted via a NR-PBCH or a PDSCH, for example, and may be referred to as broadcast information. As shown in FIG. 1, the base station 10 transmits a control signal or data in DL (Downlink) to the terminal 20 and receives a control signal or data in UL (Uplink) from the terminal 20. Note that, here, what is transmitted via a control channel such as PUCCH and PDCCH is called a control signal, and what is transmitted via a shared channel such as PUSCH and PDSCH is called data. These names are mere examples.

The terminal 20 may be a communication apparatus that includes a wireless communication function such as a smartphone, a mobile phone, a tablet, a wearable terminal, a communication module for M2M (Machine-to-Machine), or the like. As shown in FIG. 1, the terminal 20 uses various communication services provided by the wireless communication system by receiving control signals or data in DL from the base station 10 and transmitting control signals or data in UL to the base station 10. Note that the terminal 20 may be referred to as a UE, and the base station 10 may be referred to as a gNB.

The terminal 20 can perform carrier aggregation to communicate with the base station 10 by bundling a plurality of cells (a plurality of CCs). In carrier aggregation, one primary cell and one or more secondary cells are used. In addition, PUCCH-SCell having PUCCH may be used.

Figure 2:
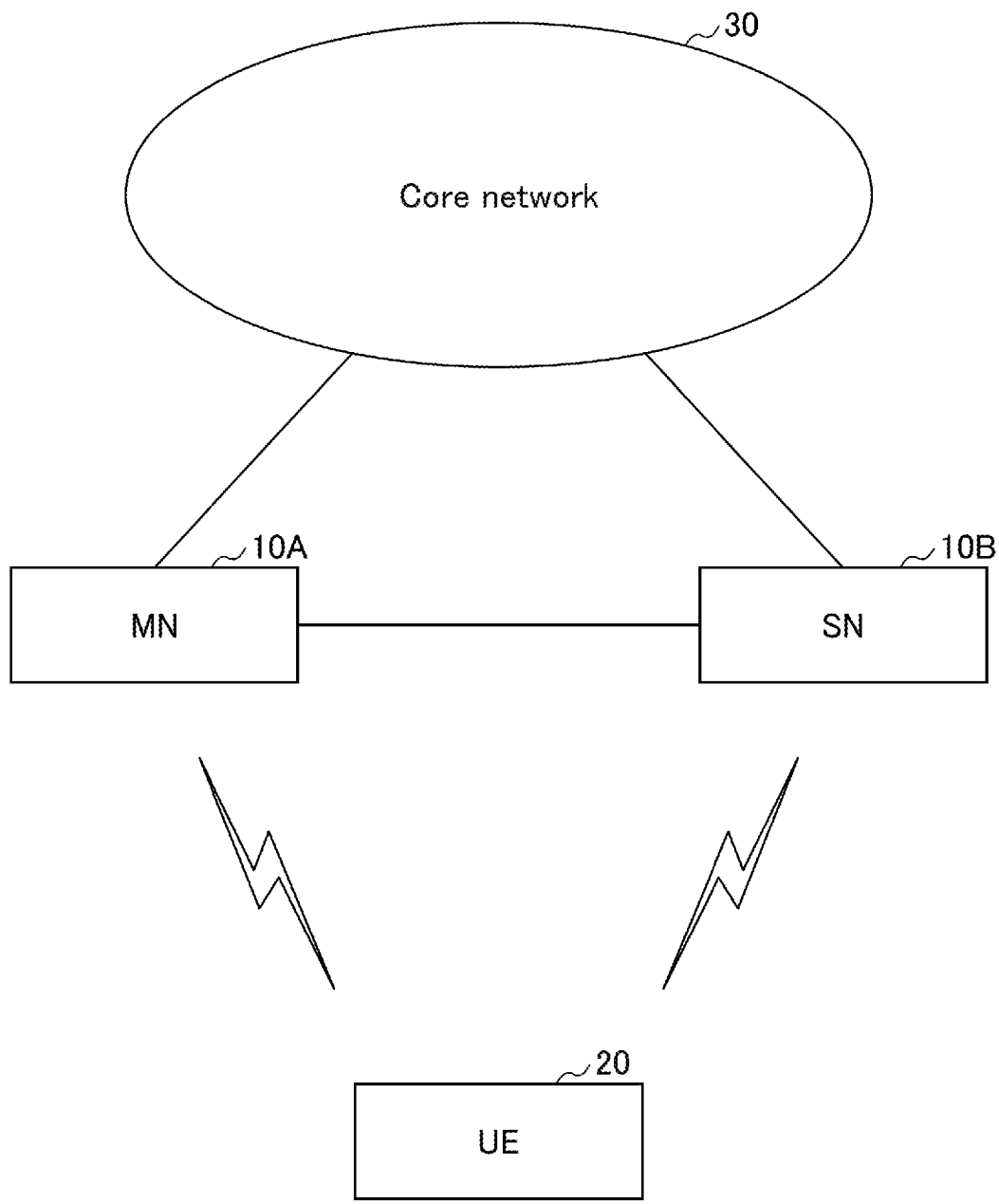
FIG. 2 is a drawing illustrating a wireless communication system according to an embodiment of the present invention.

FIG. 2 shows an example of a configuration of a wireless communication system in a case where DC (Dual connectivity) is performed. As shown in FIG. 2, a base station 10A serving as an MN (Master Node) and a base station 10B serving as an SN (Secondary Node) are provided. The base station 10A and the base station 10B are each connected to a core network. The terminal 20 is enabled to communicate with both the base station 10A and the base station 10B.

A cell group provided by the base station 10A that is an MN is called an MCG (Master Cell Group), and a cell group provided by the base station 10B that is an SN is called an SCG (Secondary Cell Group). In addition, in DC, the MCG includes one PCell and one or more SCells, and the SCG includes one PSCell (Primary SCG Cell) and one or more SCells.

Processing operations in an embodiment of the present invention may be performed in a system configuration shown in FIG. 1, in a system configuration shown in FIG. 2, or in other system configurations.

Figure 3:
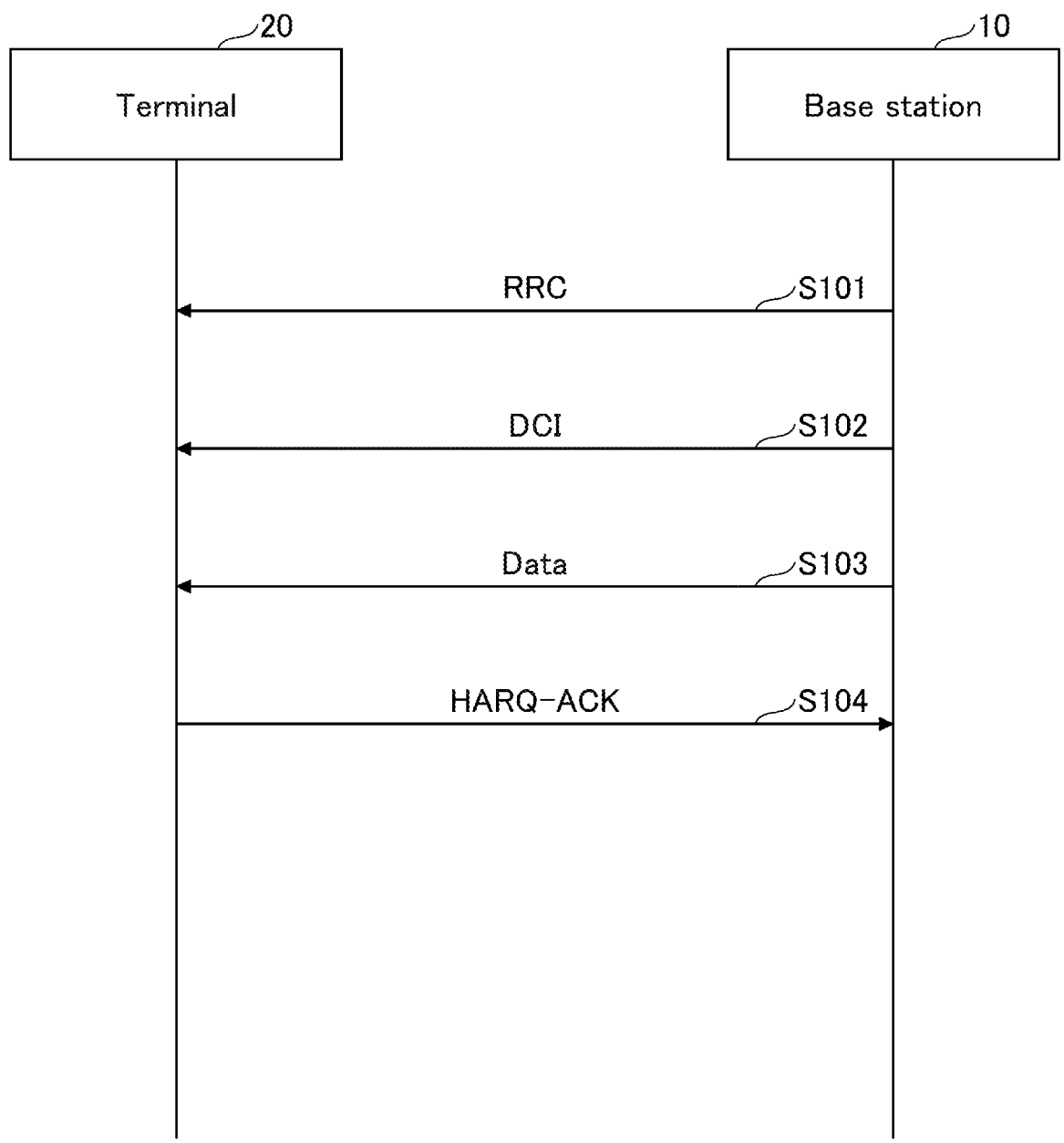
FIG. 3 is a sequence diagram illustrating a basic operation of a wireless communication system according to an embodiment of the present invention.

A basic operation example of a communication system in an embodiment of the present invention will be described referring to FIG. 3. This operation is basically an operation common to the embodiments described below.

In S101, via RRC signaling, the base station 10 transmits downlink SPS configuration information, PUCCH resource configuration information, slot format configuration information, and the like, to the terminal 20, and the terminal 20 receives these pieces of configuration information. Note that, in an embodiment of the present invention, the target is downlink SPS, and thus, hereinafter, "SPS" means downlink SPS.

The slot format configuration information is, for example, tdd-UL-DL-ConfigurationCommon or tdd-UL-DL-ConfigurationDedicated, and, according to these pieces of configuration information, the TDD configuration in each symbol of each slot in one or more slots is configured as DL, UL, or flexible. Hereinafter, the above configuration information is referred to as semi-static TDD configuration information. In addition, "flexible" may be described as "F". The terminal 20 basically determines DL/UL/F of each symbol in each slot, based on the semi-static TDD configuration information.

In addition, as the configuration information in S101, a plurality of slot format candidates may be indicated in order to enable the dynamic switching of the slot format. The configuration information is, for example, SlotFormatCombinationsPerCell. The information is information including slot format (SF) IDs, and thus, hereinafter, referred to as SFI configuration information.

In S102, the terminal 20 receives, from the base station 10, DCI that activates the SPS configuration, and, in S103, receives data via PDSCH resources according to the SPS configuration. In S104, the terminal 20 transmits, to the base station 10, SPS HARQ-ACK via the PUCCH resource of slots at the time position specified by the DCI (may also be the PUSCH resource in a case where there is UL scheduling). Hereinafter, the HARQ-ACK corresponding to the data reception via one or more PDSCH resources according to the SPS configuration will be described as "SPS HARQ-ACK". Note that, hereinafter, there may be a case in which SPS HARQ-ACK is referred to as HARQ-ACK. In addition, HARQ-ACK may be referred to as HARQ information, HARQ response, feedback information, or the like.

There may be a case in which the terminal 20 receives, from the base station 10, DCI that dynamically specifies the slot format in S102 or before or after S102. This DCI is control information that specifies an ID to be actually used from among a plurality of slot format IDs configured by the SFI configuration information. In a case where the slot format is specified by this DCI, the terminal 20 determines DL/UL/F of each symbol in each slot, based on this slot format, instead of based on the semi-static TDD configuration information. This DCI information is referred to as dynamic SFI specifying information (or, dynamic SFI, or SFI).

As described above, each time data is received according to SPS, a time position (slot), at which HARQ-ACK is transmitted via PUCCH resources, is specified to the terminal 20 via activation DCI.

However, in a case where a plurality of short-term SPSs are configured to the terminal 20, depending on the TDD DL/UL configuration (configuration by the semi-static TDD configuration information or by the dynamic SFI specifying information) in a slot of the specified time position, the symbol position, to which the PUCCH resource is configured, may collide with a DL symbol or an F symbol, and thus, the HARQ-ACK transmission may be considered to be not performed.

In a case where the PUCCH resource collides with a DL symbol or an F symbol, dropping of HARQ-ACK may be considered. However, it becomes necessary to retransmit PDSCH due to the dropping of HARQ-ACK. Accordingly, the dropping of HARQ-ACK increases the delay, which is undesirable.

Figure 4:
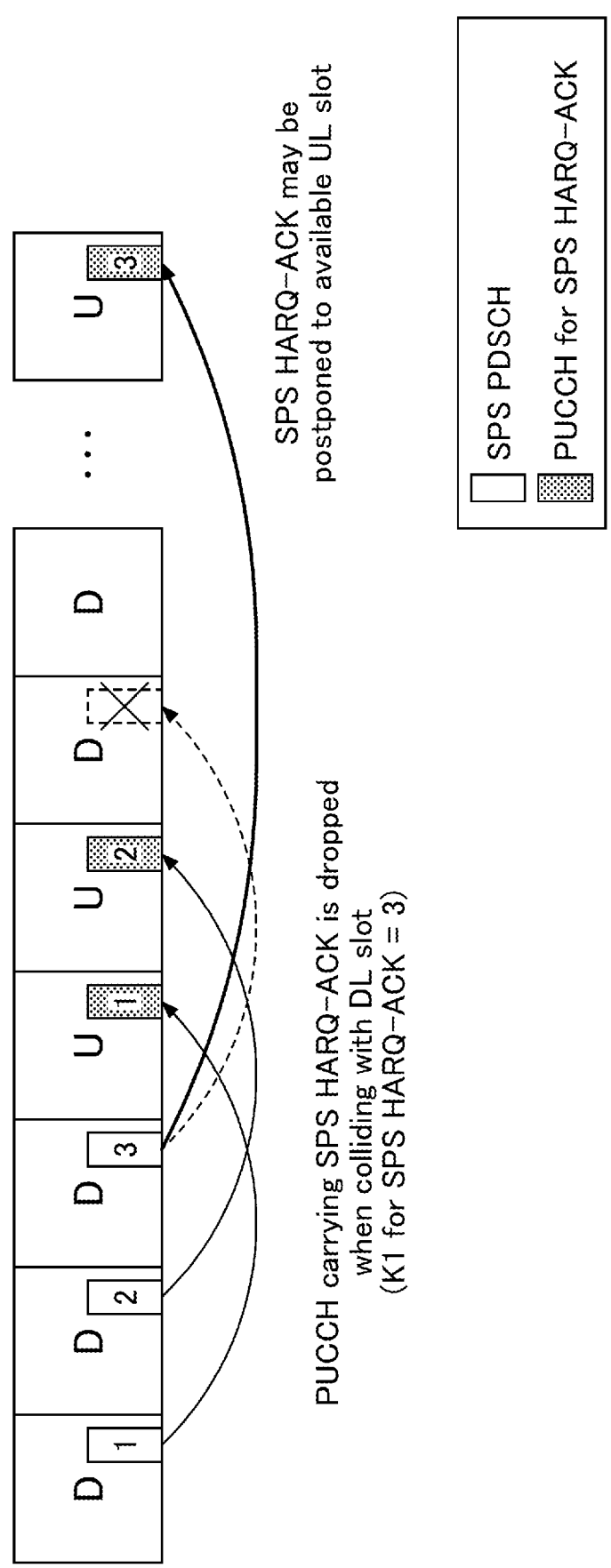
FIG. 4 is a drawing illustrating an example of SPS HARQ-ACK.

FIG. 4 is a drawing illustrating an example of SPS HARQ-ACK. An example of the above-described collision is illustrated in FIG. 4. In an example of FIG. 4, the third slot counting from a slot immediately after the slot in which PDSCH is received is specified as a slot for HARQ-ACK transmission, and in a case where the slot corresponds to DL, the HARQ-ACK is dropped.

In an embodiment of the present invention, it is possible to avoid dropping of HARQ-ACK due to a collision between the PUCCH resource and the DL symbol/F symbol.

Specifically, for example, as illustrated in FIG. 4, in a case where the terminal 20 determines that the PUCCH resource is going to collide with a DL symbol/F symbol, the HARQ-ACK transmission is postponed to be transmitted until the next available UL resource is found.

In the 3GPP meeting, enhancement of release 17 is agreed to be performed in order to avoid dropping of SPS HARQ-ACK due to the collision in TDD between PUCCH and at least one "DL or F symbol".

As an enhancement method of avoiding the dropping of SPS HARQ-ACK due to the collision between PUCCH and at least one "DL symbol or F symbol", the terminal 20 postpones the HARQ-ACK transmission until a first available valid PUCCH resource is found.

In order to postpone the SPS HARQ-ACK transmission, it is important to determine which PUCCH resource is to be used for transmitting SPS HARQ-ACK. In a case where the PUCCH resource, which is determined for transmitting SPS HARQ-ACK, is not overlapped with or is not multiplexed with, another UL channel (for example, PUCCH or PUSCH) in the time domain, the K1 value indicating an offset from data to the corresponding HARQ-ACK may be increased to reach a slot or sub-slot in which a valid PUCCH resource is present. Note that, with respect to the postponement, for example, there may be another limit such as a maximum value limit of the K1 value, an applicability limit of the resource to be postponed, or the like.

On the other hand, in a case where the PUCCH resource, which is determined for transmitting SPS HARQ-ACK, is overlapped with or multiplexed with, another UL channel (for example, PUCCH or PUSCH) in the time domain, a result of determination of which slot or sub-slot is to be used for performing the postponed SPS HARQ-ACK may affect a UL multiplexing operation.

Here, the following cases of 1) to 5) are assumed with respect to the generation of HARQ-ACK codebook (CB) for the postponed SPS HARQ-ACK transmission.

1) In a case where different priorities are configured to a plurality of postponed SPS HARQ-ACK bits, it is necessary to determine whether the postponement is to be performed according to the slot unit or performed according to the sub-slot unit. In addition, it is necessary to determine whether the HARQ-ACK codebook is to be a HARQ-ACK codebook that is separated for each priority or a concatenated HARQ-ACK codebook.

2) In a case where the type 1 HARQ-ACK codebook is configured, there is a possibility that PDSCH occasions according to SPS are not included in the PDSCH occasion candidates corresponding to the HARQ-ACK codebook in the postponed slot or sub-slot. Note that the type 1 HARQ-ACK codebook may be a semi-static codebook.

3) In a case where the type 2 HARQ-ACK CB is configured, by particularly considering the order of HARQ-ACK bits, it is necessary to define a procedure of generating a HARQ-ACK codebook by assuming a case with un-postponed SPS HARQ-ACK bits or dynamic HARQ-ACK bits and a case without unpostponed SPS HARQ-ACK bits or dynamic HARQ-ACK bits. Note that the type 2 HARQ-ACK codebook may be a dynamic codebook.

4) It is necessary to determine how many SPS HARQ-ACK bits can be postponed in a HARQ-ACK codebook in a slot or sub-slot.

5) It is necessary to determine a UE operation in a case where the number of bits available for transmitting the SPS HARQ-ACK bits according to the limit is less than the total number of SPS HARQ-ACK bits to be postponed.

The method of configuring a HARQ-ACK codebook that can support the above-described cases will be described below.

Figure 5:
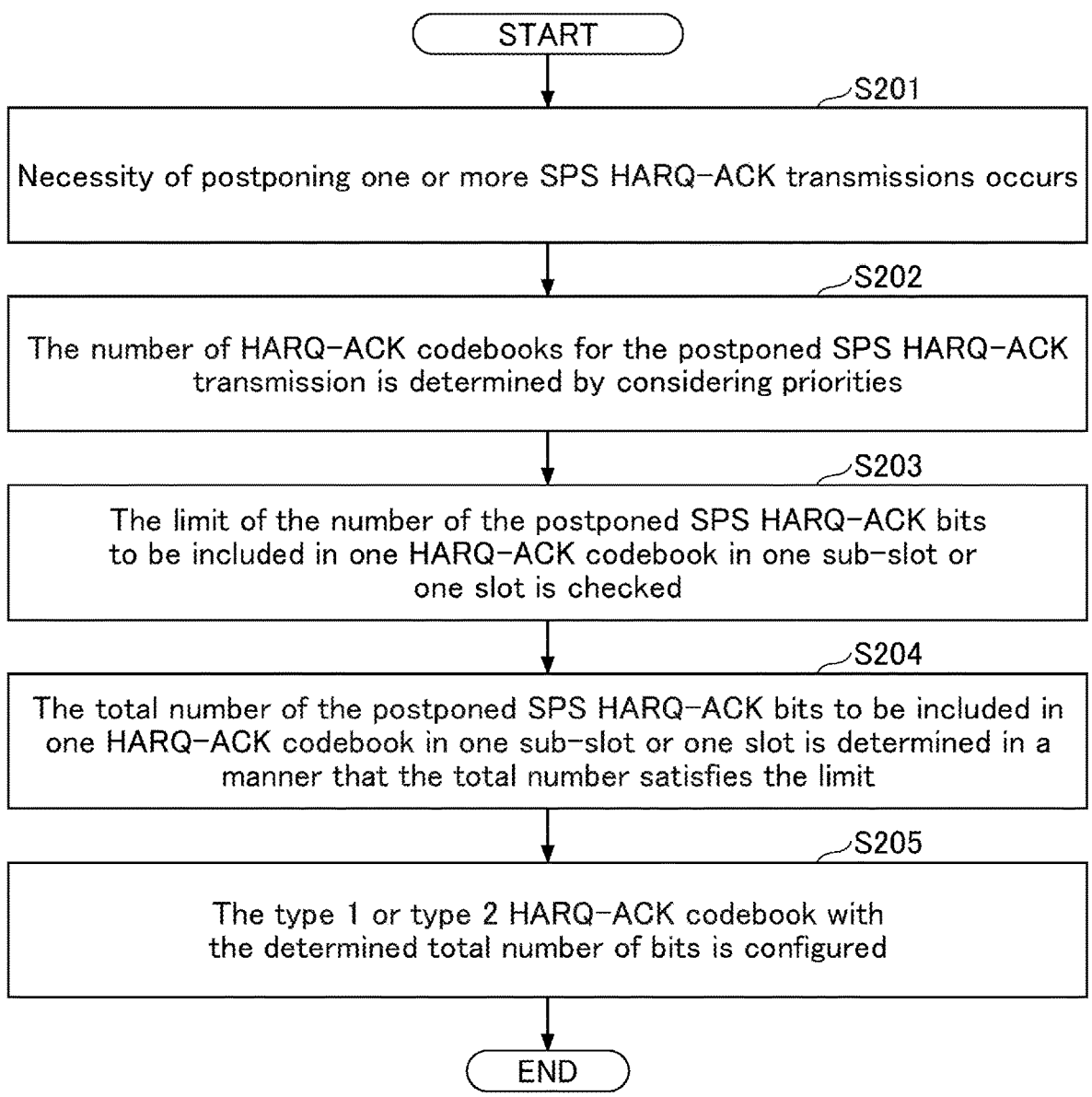
FIG. 5 is a flowchart illustrating an example of SPS HARQ-ACK transmission according to an embodiment of the present invention.

FIG. 5 is a flowchart illustrating an example of SPS HARQ-ACK transmission according to an embodiment of the present invention. In step S201, in the terminal 20, the necessity of postponing one or more SPS HARQ-ACK transmissions occurs.

In subsequent step S202, the terminal 20 determines the number of HARQ-ACK codebooks for transmitting postponed SPS HARQ-ACKs by considering the priorities. For example, the number of HARQ-ACK CBs may be 1 or 2.

In subsequent step S203, the terminal 20 checks the limit of the number of postponed SPS HARQ-ACK bits to be included in one HARQ-ACK codebook in one sub-slot or one slot.

In subsequent step S204, the terminal 20 determines the total number of postponed SPS HARQ-ACK bits to be included in one HARQ-ACK codebook in one sub-slot or one slot to satisfy the limit.

In subsequent step S205, the terminal 20 configures the type 1 or type 2 HARQ-ACK codebook with the determined total number of bits.

Regarding the priorities in the above-described step S202, a case is assumed in which priorities different from each other are configured to a plurality of SPS HARQ-ACK bits. Hereinafter, SPS HARQ-ACK with high priority will be described as HP (High priority) SPS HARQ-ACK, and SPS HARQ-ACK with low priority will be described as LP (Low priority) SPS HARQ-ACK.

A state, in which priorities different from each other are configured to a plurality of SPS HARQ-ACK bits, may occur only in a case where HP SPS HARQ-ACK and LP SPS HARQ-ACK are both enabled to be postponed.

For example, a configuration may be available in which postponement of SPS HARQ-ACK can be enabled or disabled with respect to each SPS configuration. That is, a state, in which priorities different from each other are configured to a plurality of SPS HARQ-ACK bits, may occur in a case where the postponement of SPS HARQ-ACK is enabled in at least one SPS configuration from among SPS configurations corresponding to HP SPS HARQ-ACKs, and where the postponement of SPS HARQ-ACK is enabled in at least one SPS configuration from among SPS configurations corresponding to LP SPS HARQ-ACKs.

In addition, for example, a configuration may be available in which postponement of SPS HARQ-ACK can be enabled or disabled for each priority. In a case where postponement of SPS HARQ-ACK is enabled for HP and LP, a state may occur in which priorities different from each other are configured to a plurality of SPS HARQ-ACK bits.

As described above, in a case where priorities different from each other are configured to a plurality of SPS HARQ-ACK bits, HARQ-ACK codebooks separated for each priority may be used. For example, the transmission of HP SPS HARQ-ACK bits may be postponed by increasing the K1 value according to the sub-slot unit or slot unit that is associated with configuration of a HP SPS HARQ-ACK codebook, and the PUCCH resource selection may be performed based on a rule for the postponed HP SPS HARQ-ACK.

In addition, the transmission of LP SPS HARQ-ACK bits may be postponed by increasing the K1 value according to the sub-slot unit or slot unit that is associated with configuration of an LP SPS HARQ-ACK codebook, and the PUCCH resource selection may be performed based on a rule for the postponed LP SPS HARQ-ACK.

Figure 6:
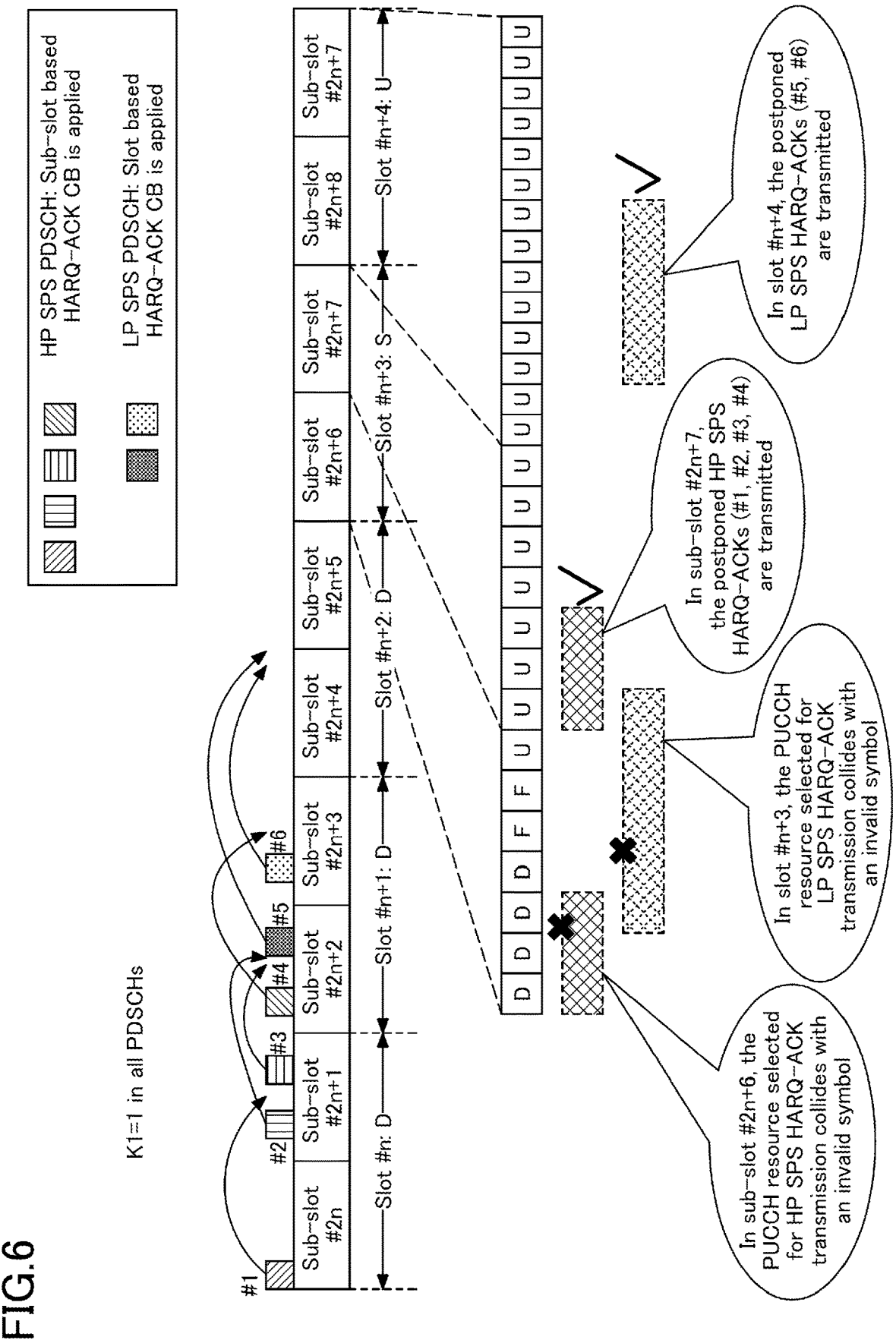
FIG. 6 is a drawing illustrating an example (1) of SPS HARQ-ACK transmission in an embodiment of the present invention.

FIG. 6 is a drawing illustrating an example (1) of SPS HARQ-ACK transmission in an embodiment of the present invention. In an example illustrated in FIG. 6, K1=1 according to the sub-slot unit is applied to HP SPS HARQ-ACK, and K1=1 according to the slot unit is applied to LP SPS HARQ-ACK.

As illustrated in FIG. 6, the PUCCH resource in sub-slot #2n+6 for HP SPS HARQ-ACK transmission corresponding to HP SPS PDSCH #1, HP SPS PDSCH #2, HP SPS PDSCH #3 and HP SPS PDSCH #4, collides with an invalid symbol, and thus, the HP SPS HARQ-ACK transmission is postponed, and HP SPS HARQ-ACK is transmitted in sub-slot #2n+7.

On the other hand, the PUCCH resource in slot #n+3 for LP SPS HARQ-ACK transmission corresponding to LP SPS PDSCH #5 and LP SPS PDSCH #6, collides with an invalid symbol, and thus, the LP SPS HARQ-ACK transmission is postponed, and LP SPS HARQ-ACK is transmitted in slot #n+4.

As another example, as described above, in a case where priorities different from each other are configured to a plurality of SPS HARQ-ACK bits, one HARQ-ACK codebook may be used. For example, the transmission of SPS HARQ-ACK bits may be postponed by increasing the K1 value according to the sub-slot unit or slot unit that is associated with configuration of a HP SPS HARQ-ACK codebook, and the PUCCH resource selection may be performed based on a rule for the postponed HP SPS HARQ-ACK. The determined PUCCH may be assumed to be HP in the channel multiplexing or in the prioritization of channels in the UE.

Figure 7:
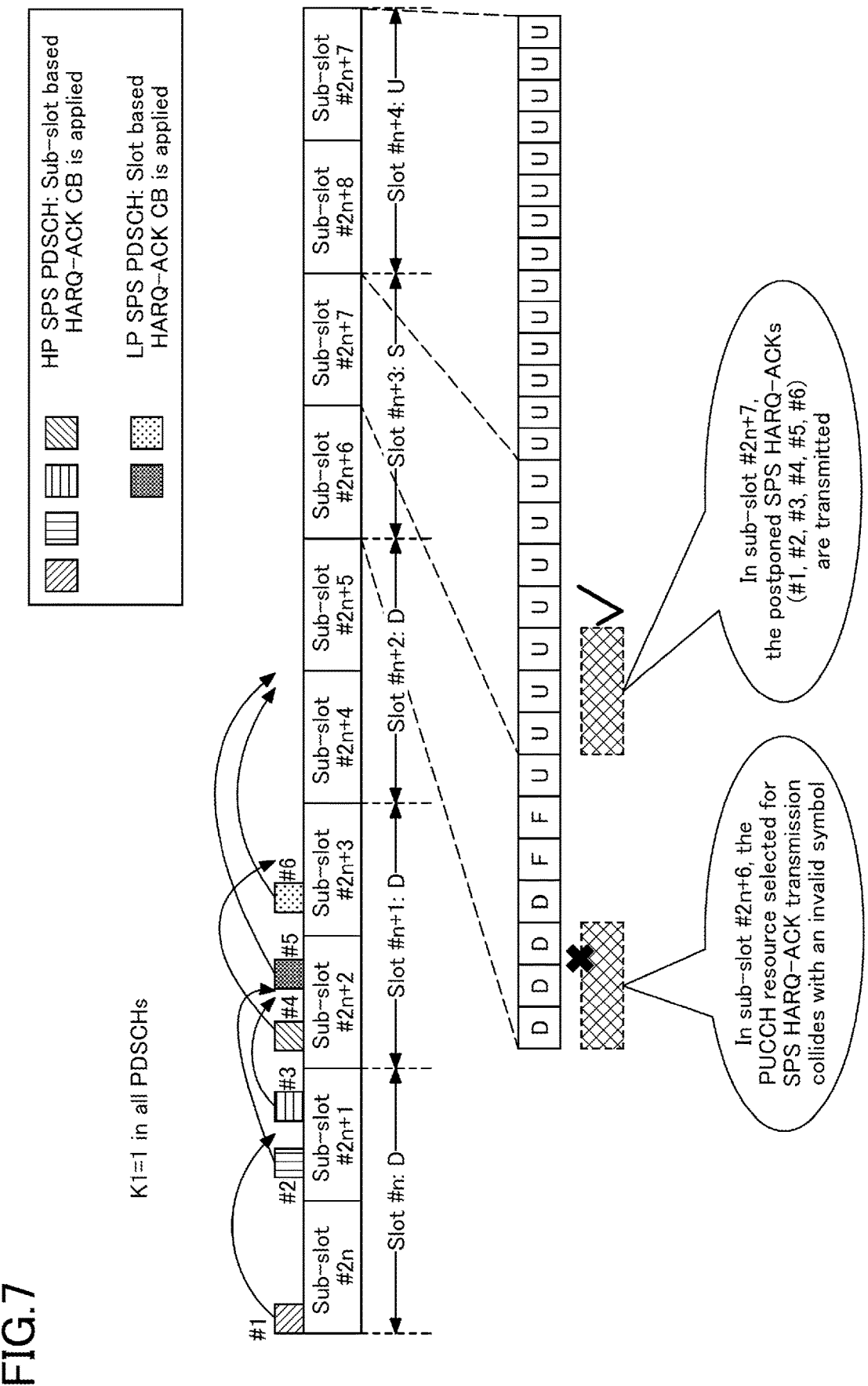
FIG. 7 is a drawing illustrating an example (2) of SPS HARQ-ACK transmission in an embodiment of the present invention.

FIG. 7 is a drawing illustrating an example (2) of SPS HARQ-ACK transmission in an embodiment of the present invention. In an example illustrated in FIG. 7, K1=1 according to sub-slot unit is applied to HP SPS HARQ-ACK.

As illustrated in FIG. 7, the PUCCH resource in sub-slot #2n+6 for SPS HARQ-ACK transmission corresponding to HP SPS PDSCH #1, HP SPS PDSCH #2, HP SPS PDSCH #3, HP SPS PDSCH #4, LP SPS PDSCH #5 and LP SPS PDSCH #6 collides with an invalid symbol, and thus, the SPS HARQ-ACK transmission is postponed, and SPS HARQ-ACK is transmitted in sub-slot #2n+7.

As described above, in a case where priorities different from each other are configured to a plurality of SPS HARQ-ACK bits, one HARQ-ACK codebook may be used to decrease the delay of LP SPS HARQ-ACK transmission.

In addition, as another example, the transmission of SPS HARQ-ACK bits may be postponed by increasing the K1 value according to the sub-slot unit or slot unit that is associated with configuration of an LP SPS HARQ-ACK codebook, and the PUCCH resource selection may be performed based on a rule for the postponed LP SPS HARQ-ACK. The determined PUCCH may be assumed to be LP in the channel multiplexing or in the prioritization of channels in the UE.

Figure 8:
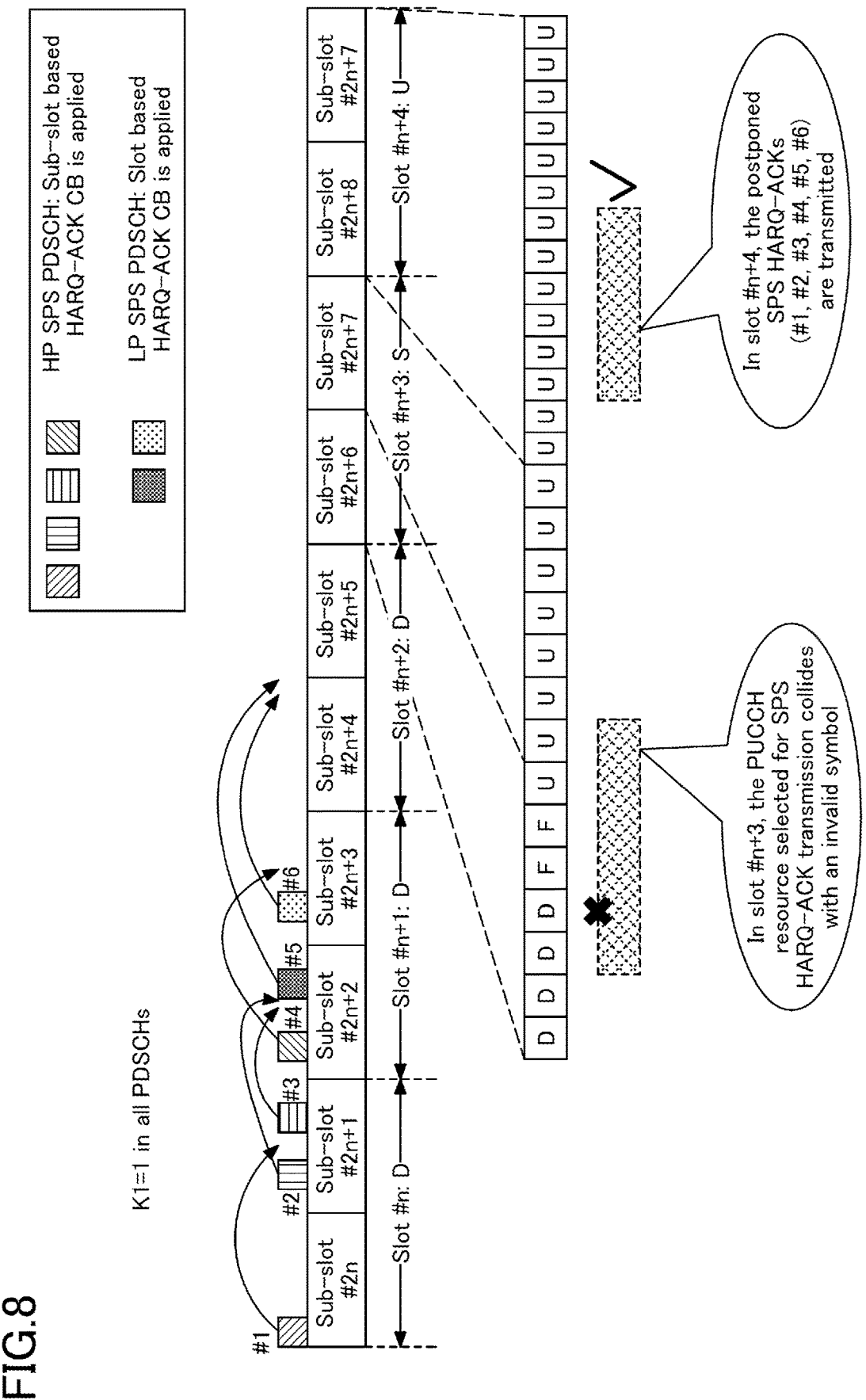
FIG. 8 is a drawing illustrating an example (3) of SPS HARQ-ACK transmission in an embodiment of the present invention.

FIG. 8 is a drawing illustrating an example (3) of SPS HARQ-ACK transmission in an embodiment of the present invention. In an example illustrated in FIG. 8, K1=1 according to the slot unit is applied to LP SPS HARQ-ACK.

As illustrated in FIG. 8, the PUCCH resource in slot #n+3 for SPS HARQ-ACK transmission corresponding to HP SPS PDSCH #1, HP SPS PDSCH #2, HP SPS PDSCH #3, HP SPS PDSCH #4, LP SPS PDSCH #5 and LP SPS PDSCH #6 collides with an invalid symbol, and thus, the SPS HARQ-ACK transmission is postponed, and SPS HARQ-ACK is transmitted in slot #n+4.

In the above-described step S203, with respect to the limit of the number of postponed SPS HARQ-ACK bits to be included in one HARQ-ACK codebook in one sub-slot or one slot, the following methods described in 1) to 4) may be applied.

1) There may be no limit for the number of postponed SPS HARQ-ACK bits in one slot or one sub-slot. The number of the SPS HARQ-ACK bits may be determined according to the number of SPS HARQ-ACKs that satisfy a condition of transmission postponement. The condition of transmission postponement may include a limit according to the maximum K1 value, may include a condition of TDD collision with a semi-static D symbol, or may include a condition of TDD collision with a semi-static F symbol. Note that, with respect to the semi-static F symbol, there may be an additional condition, or there may be no additional condition.

2) With respect to the total number of the postponed SPS HARQ-ACK bits for each slot or sub-slot, a fixed upper limit value (for example, N bits) may be configured for all serving cells or for one serving cell within MCG, SCG, or a PUCCH group. The upper limit value may be the same or different for different slots or sub-slots. The slot index or sub-slot index within one TDD configuration period may be used for defining the upper limit value. The total number of postponed SPS HARQ-ACK bits in one slot or sub-slot may be determined to be less than the upper limit value, and the total number of the SPS HARQ-ACK bits may further satisfy a condition of transmission postponement.

3) With respect to the total number of the postponed SPS HARQ-ACK bits for each HARQ-ACK codebook in one slot or sub-slot, a fixed upper limit value (for example, N bits) may be configured for all serving cells or for one serving cell within MCG, SCG, or a PUCCH group. In a case where two HARQ-ACK codebooks are supported in one slot or sub-slot, the upper limit value may be the same or different between the two HARQ-ACK codebooks. The upper limit value may be the same or different for different slots or sub-slots. The slot index or sub-slot index within one TDD configuration period may be used for defining the upper limit value. The total number of postponed SPS HARQ-ACK bits in one slot or sub-slot may be determined to be less than the upper limit value, and the total number of the SPS HARQ-ACK bits corresponding to the HARQ-ACK codebooks may further satisfy a condition of transmission postponement.

4) The upper limit value of the number of postponed SPS HARQ-ACK bits in one slot or sub-slot may be limited by the resource. In a case where the selected PUCCH resource corresponding to the HARQ-ACK codebooks is not sufficient for transmitting all of the SPS HARQ-ACK bits that satisfy the condition of transmission postponement, the maximum value of the number of postponed SPS HARQ-ACK bits in one slot or sub-slot may be determined based on the maximum payload size of the PUCCH resource or of the maximum PRB resource of the PUCCH resource.

With respect to the above-described 2) and 3), the upper limit value may be defined by the specifications in advance, may be configured by RRC, or may be indicated by DCI. The DCI format may be an existing UE-specific DCI (UE specific DCI) with or without scheduling data, may be an existing group-common DCI (Group common DCI) that indicates or that does not indicate an existing function, or may be a new DCI format. The DCI field may be a new DCI field, or an existing field may be re-interpreted as a case where the existing field is not used for another indication purpose (RV (Redundancy Version), HPN (HARQ Process Number), MCS (Modulation and Coding Scheme), FDRA (Frequency Domain Resource Allocation), or the like).

In the above-described step S204, in a case where the total number of postponed SPS HARQ-ACK bits exceeds the limit, the following methods described in 1) to 4) may be applied.

1) The terminal 20 may drop all of the SPS HARQ-ACK bits to be postponed to the slot or sub-slot.

2) In a case where a condition of further postponing the SPS HARQ-ACK transmission to the subsequent slot or sub-slot is satisfied, the terminal 20 may postpone the SPS HARQ-ACK transmission to the subsequent slot or sub-slot. In a case where a condition of further postponing the SPS HARQ-ACK transmission to the subsequent slot or sub-slot is not satisfied, the SPS HARQ-ACK bits may be dropped.

3) The terminal 20 may transmit a part of the SPS HARQ-ACK bits that does not exceed the limit of the number of bits via the selected PUCCH resource. The terminal 20 may drop the remaining SPS HARQ-ACK bits. In a case where a condition of further postponing transmission of the remaining SPS HARQ-ACK bits to the subsequent slot or sub-slot is satisfied, the terminal 20 may postpone transmission of the remaining SPS HARQ-ACK bits to the subsequent slot or sub-slot. In a case where a condition of further postponing transmission of the remaining SPS HARQ-ACK bits to the subsequent slot or sub-slot is not satisfied, the terminal 20 may drop the remaining SPS HARQ-ACK bits.

4) The postponed SPS HARQ-ACK bits may be bundled. For example, every X bits may be bundled to one bit. X is a bundle size, and may be defined by the specifications in advance, may be configured by RRC, or may be indicated by DCI. The DCI format may be an existing UE-specific DCI with or without scheduling data, may be an existing group common DCI that indicates or that does not indicate an existing function, or may be a new DCI format. The DCI field may be a new DCI field, or an existing field may be re-interpreted as a case where the existing field is not used for another indication purpose.

Note that the above-described 1) to 4) may be applied to different ranges. For example, the above-described 1) to 4) may be applied to all SPS HARQ-ACK bits in all CCs, or a different method may be applied to a different serving cell.

Note that, with respect to the above-described 3), a part of SPS HARQ-ACK bits that does not exceed the limit of the number of bits may be determined by a method described below.

First, the order of postponed SPS HARQ-ACK bits is determined. The order may be determined, for example, as described in 1) to 8) below.

1) The order may be determined based on the permutations of four elements including {serving cell index}, {SPS configuration index}, {SPS occasion slot index}, and {HARQ-ACK priority index}. There are 24 permutations, and any permutation may be used.
2) The order may be determined based on the permutations of three elements including {serving cell index}, {SPS configuration index}, and {SPS occasion slot index}. There are 6 permutations, and any permutation may be used.
3) The order may be determined based on the permutations of three elements including {serving cell index}, {SPS PDSCH occasion start symbol or end symbol} and {HARQ-ACK priority index}. There are 6 permutations, and any permutation may be used.
4) The order may be determined based on the permutations of two elements including {serving cell index} and {SPS PDSCH occasion start symbol or end symbol}. There are 2 permutations, and any permutation may be used.
5) The order may be determined based on the permutations of three elements including {serving cell index}, {index of a UL slot or sub-slot in which the HARQ-ACK codebook is dropped}, and {HARQ-ACK priority index}. There are 6 permutations, and any permutation may be used.
6) The order may be determined based on the permutations of two elements including {serving cell index} and {index of a UL slot or sub-slot in which the HARQ-ACK codebook is dropped}. There are 2 permutations, and any permutation may be used.
7) The order may be determined based on the permutations of three elements including {serving cell index}, {HARQ process ID} and {HARQ-ACK priority index}. There are 6 permutations, and any permutation may be used.
8) The order may be determined based on the permutations of two elements including {serving cell index} and {HARQ process ID}. There are 2 permutations, and any permutation may be used.

Second, bits from the first or the last of the determined permutation may be dropped with the granularity described in 1) to 10) below, until the number of SPS HARQ-ACK bits becomes less than the limit.
1) Per-bit granularity
2) Per-serving cell index granularity
3) Per-UL slot or sub-slot granularity corresponding to the dropped HARQ-ACK codebook
4) Per-DL slot or sub-slot granularity
5) Per-SPS configuration granularity
6) Per-start symbol or end symbol granularity
7) Per-HARQ-ACK priority granularity (limited to a case in which priorities are configured)
8) Granularity depending on whether or not a condition of further postponing transmission is satisfied (for example, the bits can be divided into bits that satisfy the condition and bits that do not satisfy the condition)
9) Per-HARQ process ID granularity
10) Granularity according to a combination of the above-described 2) to 9) (for example, granularity per SPS configuration and serving cell, granularity per DL slot or sub-slot and serving cell, etc.)

The dropping method described in the above-described 1) to 10) may be determined by being associated with a method of determining the order of HARQ-ACK bits. In addition, for example, there may be a plurality of dropping method candidates for one method of determining the order of HARQ-ACK bits.

In a case where the repeated transmission of SPS PDSCH is configured, the "DL slot or sub-slot" in the above-described 4) may correspond to the DL slot or sub-slot including the last repetition of SPS PDSCH transmission. In addition, in a case where the repeated transmission of SPS PDSCH is configured, the "start symbol or end symbol" in the above-described 6) may correspond to the start symbol or end symbol in the last repetition of SPS PDSCH transmission.

Figure 9:
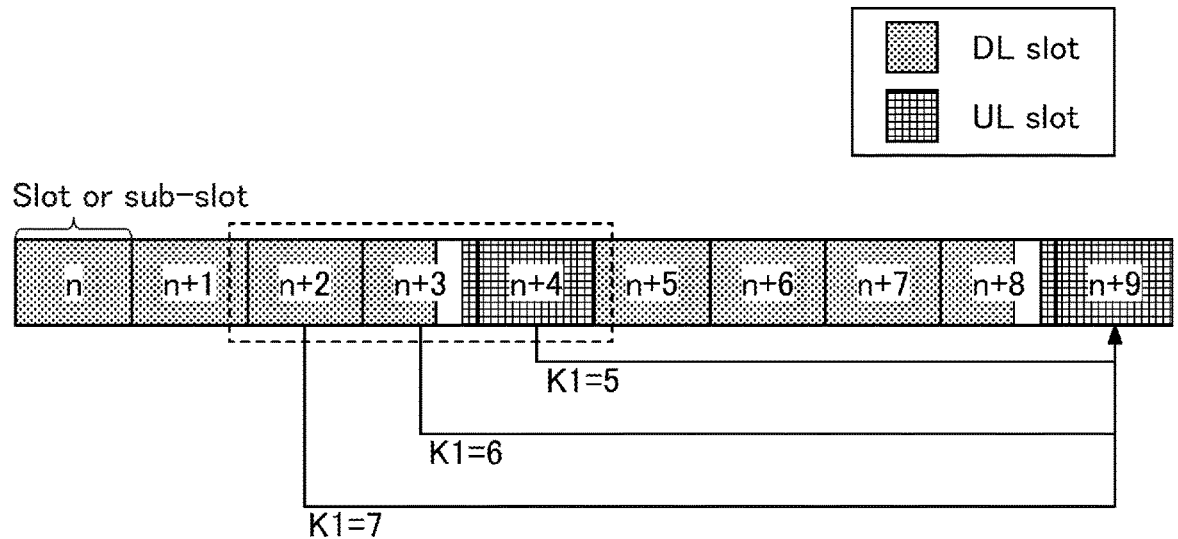
FIG. 9 is a drawing illustrating an example of configuring a HARQ-ACK CB.

FIG. 9 is a drawing illustrating an example of configuring a HARQ-ACK CB. An example of generating the type 1 HARQ-ACK codebook will be described using FIG. 9.

As a first process, a HARQ-ACK occasion for the PDSCH reception candidate is determined. The terminal 20 determines the HARQ-ACK occasion for the PDSCH reception candidate for the serving cell c in which active DL-BWP and active UL-BWP are configured. The terminal 20 determines the HARQ-ACK window size, based on the HARQ-ACK timing value, K1. An example is illustrated in FIG. 9 in which K1=5, 6 and 7. In FIG. 9, the HARQ-ACK window is indicated by a dashed line enclosing slot #n+2, slot #n+3, and slot #n+4.

As a second process, with respect to each K1, the PDSCH reception occasion candidate is determined in the corresponding slot. The PDSCH reception occasion candidate is associated with a set R in the resource allocation table in the time domain. In addition, the PDSCH reception occasion candidate in the resource allocation table in the time domain, wherein the PDSCH reception occasion candidate overlaps with UL configured by the parameter TDD-UL-DL-ConfigurationCommon and the parameter TDD-UL-DL-ConfigDedicated, is excluded. In addition, in a case where the PDSCH reception occasion candidates overlap with each other in the time domain, the PDSCH reception occasion candidates are generated based on a specific rule.

As a third process, the terminal 20 determines HARQ-ACK information bits with a total number of bits $O^{ACK}$. The terminal 20 reports HARQ-ACK information corresponding to the PDSCH reception or SPS PDSCH resource, by using the HARQ-ACK codebook in a slot that is indicated by a value of the PDSCH-to-HARQ feedback timing indicator field of the corresponding DCI format. The terminal 20 reports the HARQ-ACK information as NACK in the HARQ-ACK codebook in the slot that is not indicated by a value of the PDSCH-to-HARQ feedback timing indicator field of the corresponding DCI format.

The method of configuring the type 1 HARQ-ACK codebook in the above-described step S205 will be described below.

For example, the HARQ-ACK window corresponding to the type 1 HARQ-ACK codebook may be enhanced. The enhanced HARQ-ACK window may include the SPS PDSCH occasion corresponding to the postponed SPS HARQ-ACK bits, wherein the SPS PDSCH occasion is not included in the PDSCH occasion candidates of the normal HARQ-ACK window (for example, the HARQ-ACK window illustrated in FIG. 9).

Figure 10:
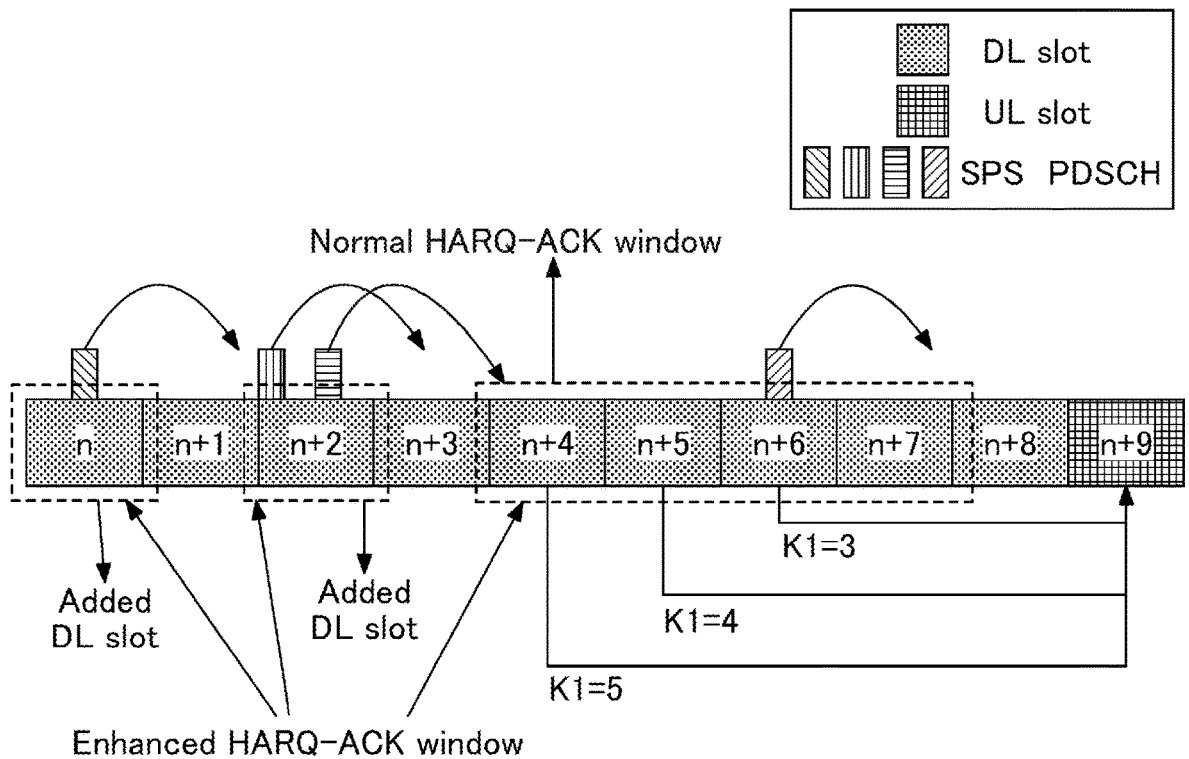
FIG. 10 is a drawing illustrating an example (1) of a HARQ-ACK window in an embodiment of the present invention.

FIG. 10 is a drawing illustrating an example (1) of a HARQ-ACK window in an embodiment of the present invention. As illustrated in FIG. 10, only a DL slot may be added as an enhanced HARQ-ACK window, wherein, in the DL slot, the SPS PDSCH occasion (corresponding to the postponed SPS HARQ-ACK bits), which is not included in the PDSCH occasion candidates within the normal HARQ- ACK window, is arranged. FIG. 10 is an example of an enhanced HARQ-ACK window in which slot #n and slot #n+2 are added to the normal HARQ-ACK window, wherein SPS PDSCH occasions are arranged in slot #n and slot #n+2, and the enhanced HARQ-ACK window includes slot #n, slot #n+2, slot #n+4, slot #n+5, slot #n+6 and slot #n+7. In FIG. 10, HARQ-ACK is transmitted in slot #n+9.

Figure 11:
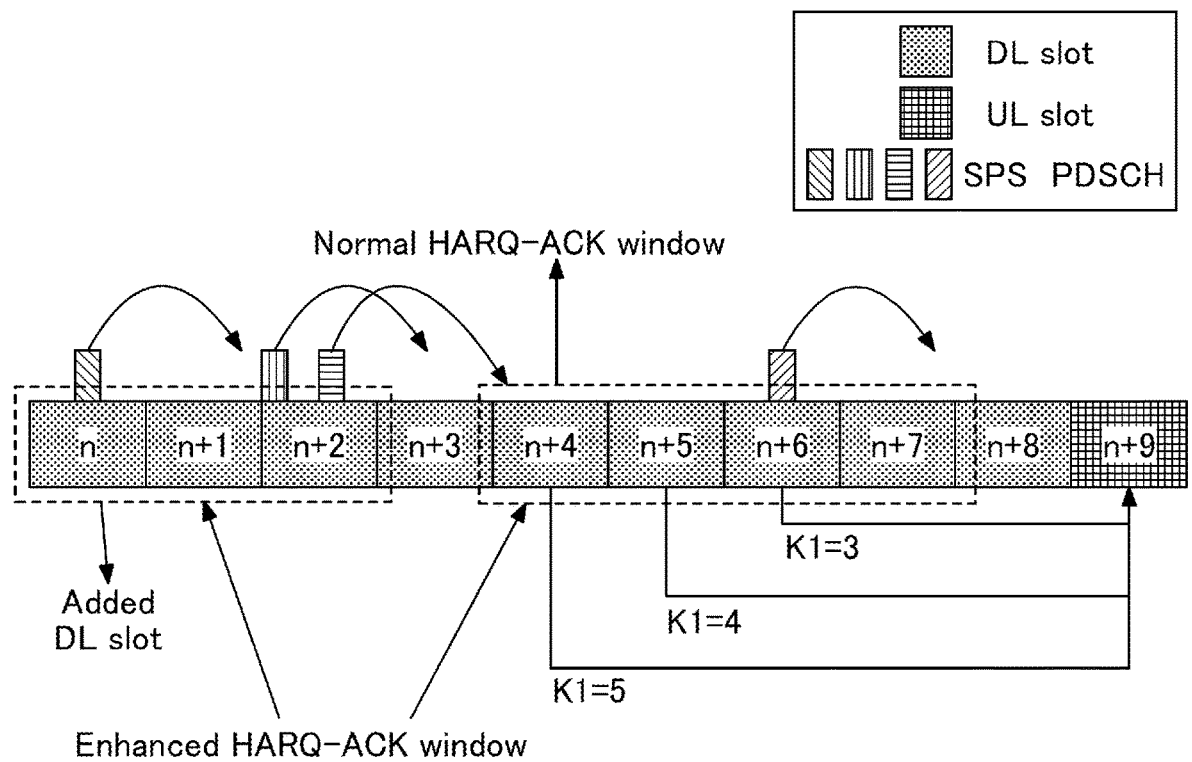
FIG. 11 is a drawing illustrating an example (2) of a HARQ-ACK window in an embodiment of the present invention.

FIG. 11 is a drawing illustrating an example (2) of a HARQ-ACK window in an embodiment of the present invention. As illustrated in FIG. 11, a plurality of contiguous slots may be added as an enhanced HARQ-ACK window, wherein the plurality of contiguous slots starting from the first slot, in which the SPS PDSCH occasion (corresponding to the postponed SPS HARQ-ACK bit) is arranged and which is not included in the PDSCH occasion candidates within the normal HARQ-ACK window, and ending in the last slot in which the SPS PDSCH occasion is arranged. Note that the first slot and the last slot include symbols in which DL transmission can be performed. FIG. 11 is an example of a HARQ-ACK window in which slot #n, slot #n+1 and slot #n+2 including the SPS PDSCH occasions are added to the normal HARQ-ACK window, and thus, the HARQ-ACK window includes slot #n, slot #n+1, slot #n+2, slot #n+4, slot #n+5, slot #n+6 and slot #n+7. In FIG. 11, HARQ-ACK is transmitted in slot #n+9.

Note that, in a case where the repeated transmission of SPS PDSCH is configured, the slot in which the SPS PDSCH occasion is arranged as illustrated in FIG. 10 and FIG. 11 may be a slot including a symbol in which DL transmission can be performed and in which the last transmission of the repeated transmissions is included.

Next, as illustrated in 1) and 2) below, the PDSCH occasion candidates may be determined based on the enhanced HARQ-ACK window corresponding to the type 1 HARQ-ACK codebook.

1) In each of the slots included in the enhanced HARQ-ACK window, the PDSCH occasion candidates may be determined in the same way as the second process described with the above-described FIG. 9. For example, in each of the slots included in the enhanced HARQ-ACK window, the PDSCH occasion candidates may be determined based on the TDRA (Time domain resource allocation) and the UL/DL configuration.

2) In a slot included in the normal HARQ-ACK window from the enhanced HARQ-ACK window, the PDSCH occasion candidates may be determined in the same way as the second process described with the above-described FIG. 9. In slots (for example, slot #n and slot #n+2 in FIG. 9) that are not included in the normal HARQ-ACK window from the enhanced HARQ-ACK window, only the SPS PDSCH occasion corresponding to the postponed SPS HARQ-ACK bit may be included in the PDSCH occasion candidates. For example, in each of the slots included in the normal HARQ-ACK window from the enhanced HARQ-ACK window, the PDSCH occasion candidates may be determined based on the TDRA and the UL/DL configuration, and in each of the slots that are not included in the normal HARQ-ACK window from the enhanced HARQ-ACK window, only the SPS PDSCH occasion corresponding to the postponed SPS HARQ-ACK bit may be included in the PDSCH occasion candidates.

Next, the HARQ-ACK bits are generated based on the determined PDSCH occasion candidates included in the enhanced HARQ-ACK window. For example, without depending on the value of the PDSCH-to-HARQ_feedback timing indicator field included in the scheduling DCI format, the terminal 20 may generate ACK or NACK for the SPS PDSCH occasion corresponding to the postponed SPS HARQ-ACK bit, based on the decoding result of the transport block With respect to the process of generating the HARQ-ACK bits based on the determined PDSCH occasion candidates included in the enhanced HARQ-ACK window, operations described in the following 1) to 6) may be applied.

1) In a case where it is not necessary for the terminal 20 to report the HARQ-ACK information in the normal HARQ-ACK window in the serving cell c, the above-described process of enhancing the HARQ-ACK window may be performed by assuming the normal HARQ-ACK window as a null window.

2) In a case where it is not necessary for the terminal 20 to report the HARQ-ACK information in the normal HARQ-ACK window in the serving cell c, the postponed SPS HARQ-ACK bits alone may be reported using the HARQ-ACK codebook in each of the serving cells. The order of the HARQ-ACK bits of the SPS PDSCH occasion corresponding to the postponed SPS HARQ-ACK bits may be determined in the same way as that of the release 16, or may be determined according to the bit order in the type 1 HARQ-ACK codebook described below.

3) In a case where the terminal 20 reports the HARQ-ACK corresponding to only the dynamic PDSCH that is scheduled by DCI 1_0 in which the counter DAI field is 1 in the primary cell, or in a case where the terminal 20 reports only the HARQ-ACK for a case in which the SPS release is indicated by DCI 1_0 in which the counter DAI field is 1 within the PDSCH occasion candidates in the slots included in the normal HARQ-ACK window in the serving cell c, the terminal 20 is not required to perform a special process.

4) In a case where the terminal 20 reports the HARQ-ACK corresponding to only the dynamic PDSCH that is scheduled by DCI 1_0 in which the counter DAI field is 1 in the primary cell, or in a case where the terminal 20 reports only the HARQ-ACK for a case in which the SPS release is indicated by DCI 1_0 in which the counter DAI field is 1 within the PDSCH occasion candidates in the slots included in the normal HARQ-ACK window in the serving cell c, the terminal 20 may determine the HARQ-ACK codebook by using the HARQ-ACK bits corresponding to the dynamic PDSCH or the SPS release and the postponed SPS HARQ-ACK bits. For example, the order of the HARQ-ACK bits in the HARQ-ACK codebook may be determined in the same way as the location of the PDSCH occasions in release 16, by mixing the HARQ-ACK bits corresponding to the dynamic PDSCH or the SPS release with the postponed SPS HARQ-ACK bits. In addition, for example, with respect to the order of HARQ-ACK bits in the HARQ-ACK codebook, the postponed SPS HARQ-ACK bits may be added after the HARQ-ACK bits corresponding to the dynamic PDSCH or the SPS release, and the order of HARQ-ACK bits of the SPS PDSCH occasions corresponding to the postponed SPS HARQ-ACK bits may be the same as that in the release 16, or may be determined by the bit order in the type 1 HARQ-ACK codebook described below.

5) In a case where the terminal 20 reports the HARQ-ACK corresponding only to the SPS PDSCH reception from among the PDSCH occasion candidates in the slots included in the normal HARQ-ACK window in the serving cell c, a special process is not required to be performed.

6) In a case where the terminal 20 reports the HARQ-ACK corresponding only to the SPS PDSCH reception from among the PDSCH occasion candidates in the slots included in the normal HARQ-ACK window in the serving cell c, the terminal 20 may determine the HARQ-ACK codebook, by using the HARQ-ACK bits corresponding to the dynamic PDSCH or the SPS release and the postponed SPS HARQ-ACK bits. For example, the order of the HARQ-ACK bits in the HARQ-ACK codebook may be determined in the same way as the location of the PDSCH occasions in release 16, by mixing the HARQ-ACK bits corresponding to the dynamic PDSCH or the SPS release with the postponed SPS HARQ-ACK bits. In addition, for example, with respect to the order of HARQ-ACK bits in the HARQ-ACK codebook, the postponed SPS HARQ-ACK bits may be added after the HARQ-ACK bits corresponding to the dynamic PDSCH or the SPS release, and the order of HARQ-ACK bits of the SPS PDSCH occasions corresponding to the postponed SPS HARQ-ACK bits may be the same as that in the release 16, or may be determined by the bit order in the type 1 HARQ-ACK codebook described below.

In addition, for example, when the type 1 HARQ-ACK codebook is used, in a case where some of the SPS PDSCH occasions corresponding to the postponed HARQ-ACK bits is not included in the PDSCH occasion candidates based on K1, the postponed SPS HARQ-ACK bits may be added after the PDSCH occasion candidates.

Note that, with respect to the SPS PDSCH occasions corresponding to the postponed HARQ-ACK bits, an SPS PDSCH occasion overlapping with a UL symbol may be assumed to have already been excluded when generating the dropped HARQ-ACK codebook. In addition, with respect to the SPS PDSCH occasions corresponding to the postponed HARQ-ACK bits, a plurality of SPS PDSCH occasions in a plurality of overlapping SPS PDSCHs may be assumed to have already been excluded when generating the dropped HARQ-ACK codebook. That is, the SPS PDSCH occasions corresponding to the postponed HARQ-ACK bits may be assumed to include no overlapping SPS PDSCH occasions. In addition, in a case where the terminal 20 is not required to report the HARQ-ACK corresponding to the PDSCH occasion candidates, the terminal 20 may determine to include only the postponed SPS HARQ-ACK bits in the HARQ-ACK codebook.

Here, the "postponed SPS HARQ-ACK bits" may be HARQ-ACK bits corresponding to the SPS PDSCH occasions corresponding to the postponed HARQ-ACK bits regardless of whether or not included in the PDSCH occasion candidates. In addition, the "postponed SPS HARQ-ACK bits" may be HARQ-ACK bits corresponding to the SPS PDSCH occasions corresponding to the postponed HARQ-ACK bits that are not included in the PDSCH occasion candidates.

Figure 12:
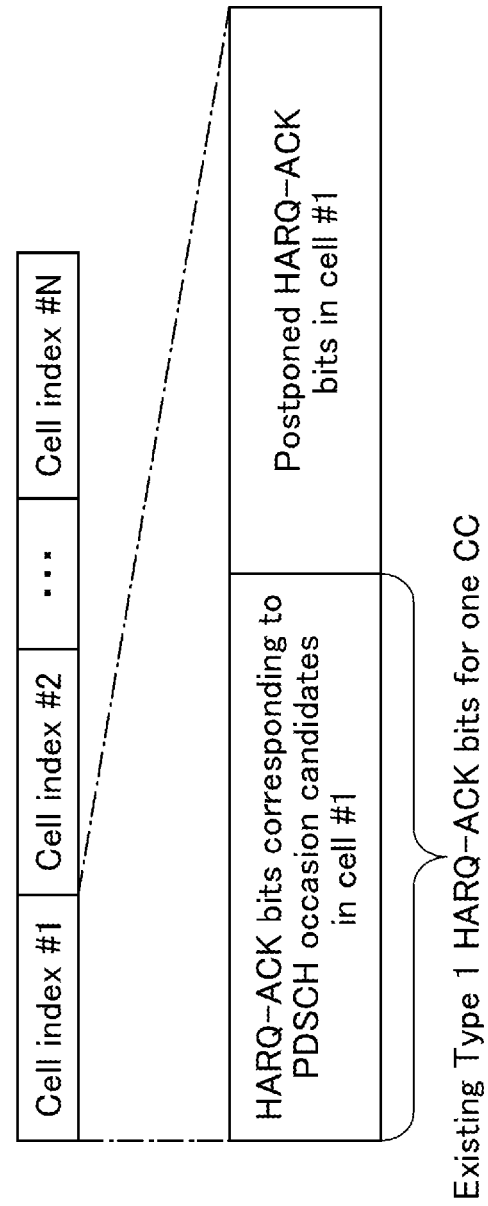
FIG. 12 is a drawing illustrating an example (1) of a HARQ-ACK CB in an embodiment of the present invention.

FIG. 12 is a drawing illustrating an example (1) of a HARQ-ACK CB in an embodiment of the present invention. As illustrated in FIG. 12, the postponed HARQ-ACK bits may be added after the HARQ-ACK bits corresponding to the PDSCH occasion candidates for each serving cell.

Figure 13:
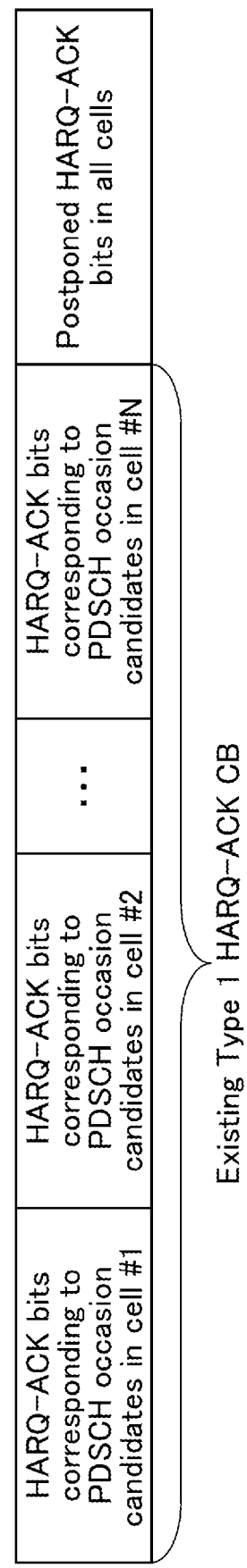
FIG. 13 is a drawing illustrating an example (2) of a HARQ-ACK CB in an embodiment of the present invention.

FIG. 13 is a drawing illustrating an example (2) of a HARQ-ACK CB in an embodiment of the present invention. As illustrated in FIG. 13, the postponed HARQ-ACK bits may be added after the HARQ-ACK bits corresponding to PDSCH occasion candidates in all of the serving cells.

As illustrated in FIG. 12, in a case where the postponed HARQ-ACK bits are added after the HARQ-ACK bits corresponding to the PDSCH occasion candidates for each of the serving cells, the order of the postponed HARQ-ACK bits may be determined by methods described in 1) to 8) below.

Figure 14:
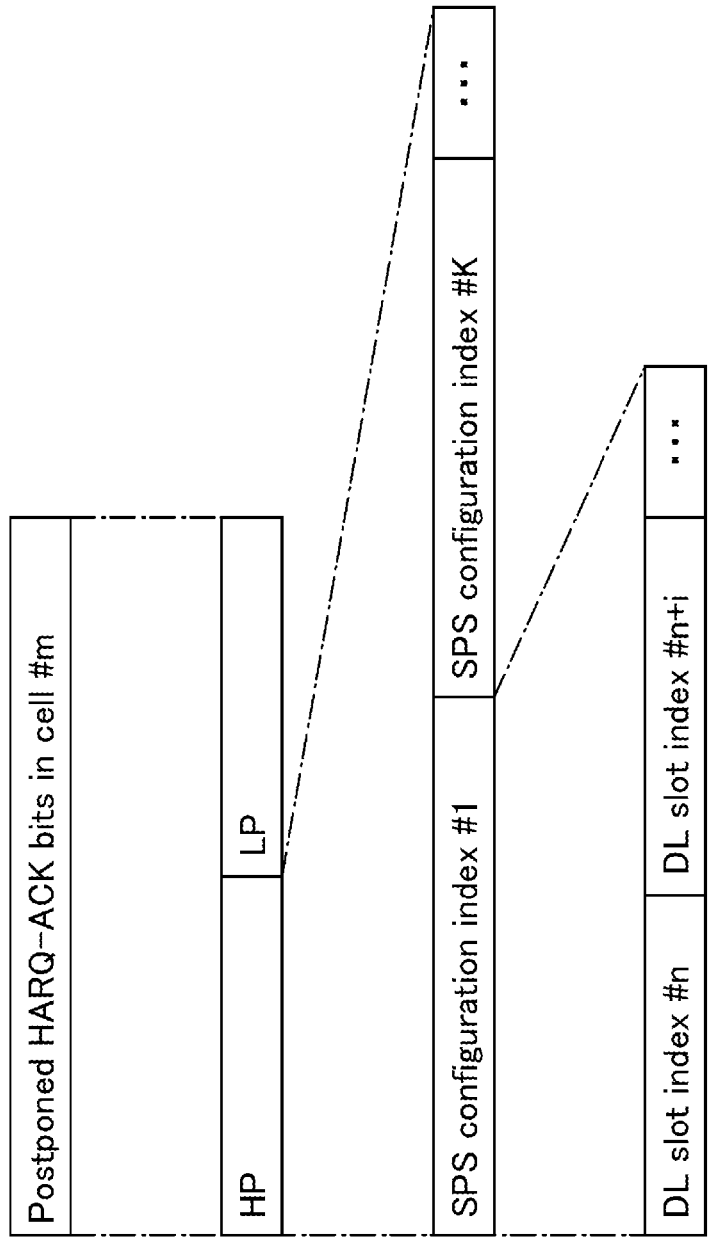
FIG. 14 is a drawing illustrating an example (3) of a HARQ-ACK CB in an embodiment of the present invention.
Figure 15:
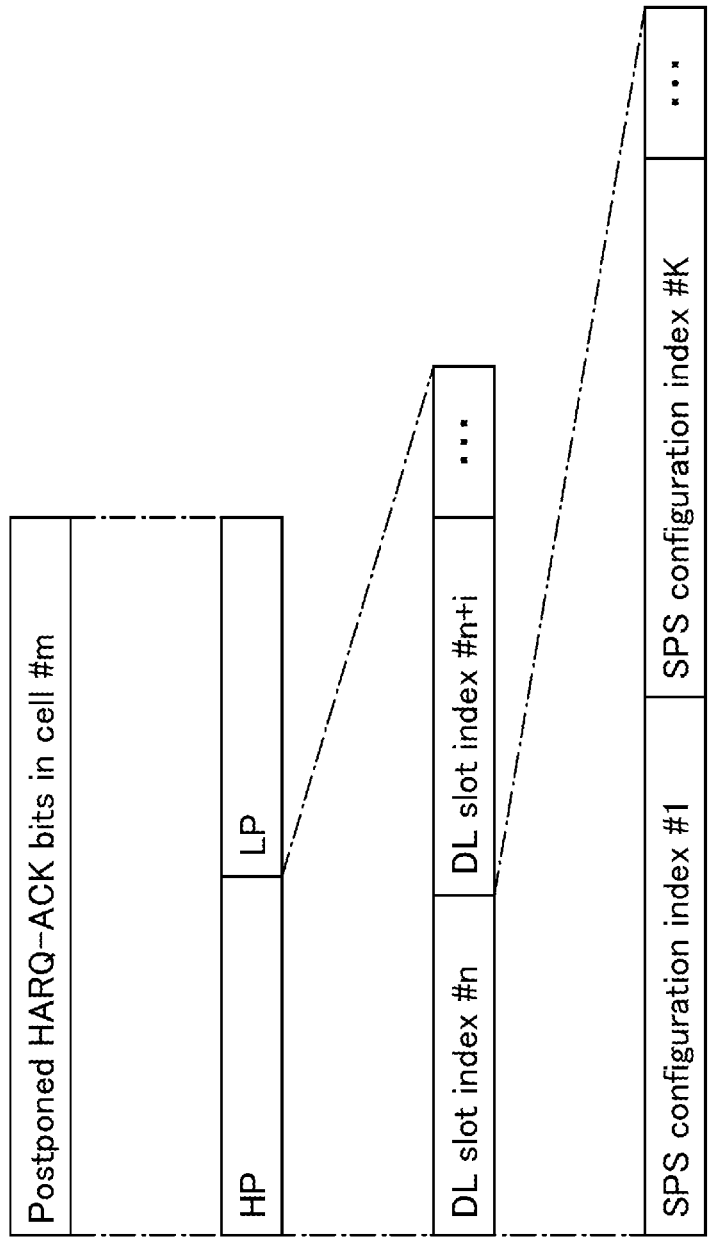
FIG. 15 is a drawing illustrating an example (4) of a HARQ-ACK CB in an embodiment of the present invention.

1) The order may be determined based on the permutations of three elements including {SPS configuration index}, {SPS occasion slot index} and {HARQ-ACK priority index}. FIG. 14 is a drawing illustrating an example (3) of a HARQ-ACK CB in an embodiment of the present invention. For example, as illustrated in FIG. 14, the order of the index set to be applied to the ordering may be {SPS occasion slot index}, {SPS configuration index}, and {HARQ-ACK priority index}. FIG. 15 is a drawing illustrating an example (4) of a HARQ-ACK CB in an embodiment of the present invention. For example, as illustrated in FIG. 15, the order of the index set to be applied to the ordering may be {SPS configuration index}, {SPS occasion slot index}, and {HARQ-ACK priority index}. For example, the order of the index set to be applied to the ordering may be {SPS occasion slot index}, {HARQ-ACK priority index}, and {SPS configuration index}. For example, the order of the index set to be applied to the ordering may be {SPS configuration index}, {HARQ-ACK priority index}, and {SPS occasion slot index}. For example, the order of the index set to be applied to the ordering may be {HARQ-ACK priority index}, {SPS occasion slot index}, and {SPS configuration index}. For example, the order of the index slot to be applied to the ordering may be {HARQ-ACK priority index}, {SPS configuration index}, and {SPS occasion slot index}. Note that the index order in each of the index sets may be an ascending order or a descending order.

Figure 16:
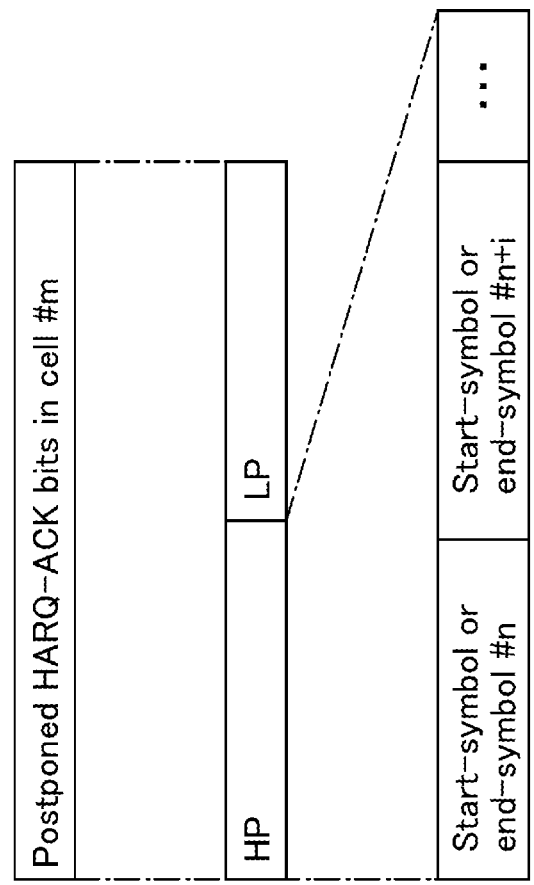
FIG. 16 is a drawing illustrating an example (5) of a HARQ-ACK CB in an embodiment of the present invention.

2) The order may be determined based on the permutations of two elements including {SPS PDSCH occasion start symbol or end symbol} and {HARQ-ACK priority index}. For example, the order of the index set to be applied to the ordering may be {HARQ-ACK priority index} and {SPS PDSCH occasion start symbol or end symbol}. FIG. 16 is a drawing illustrating an example (5) of a HARQ-ACK CB in an embodiment of the present invention. As illustrated in FIG. 16, for example, the order of the index set to be applied to the ordering may be {SPS PDSCH occasion start symbol or end symbol} and {HARQ-ACK priority index}. Note that the index order in each of the index sets may be an ascending order or a descending order.

Figure 17:
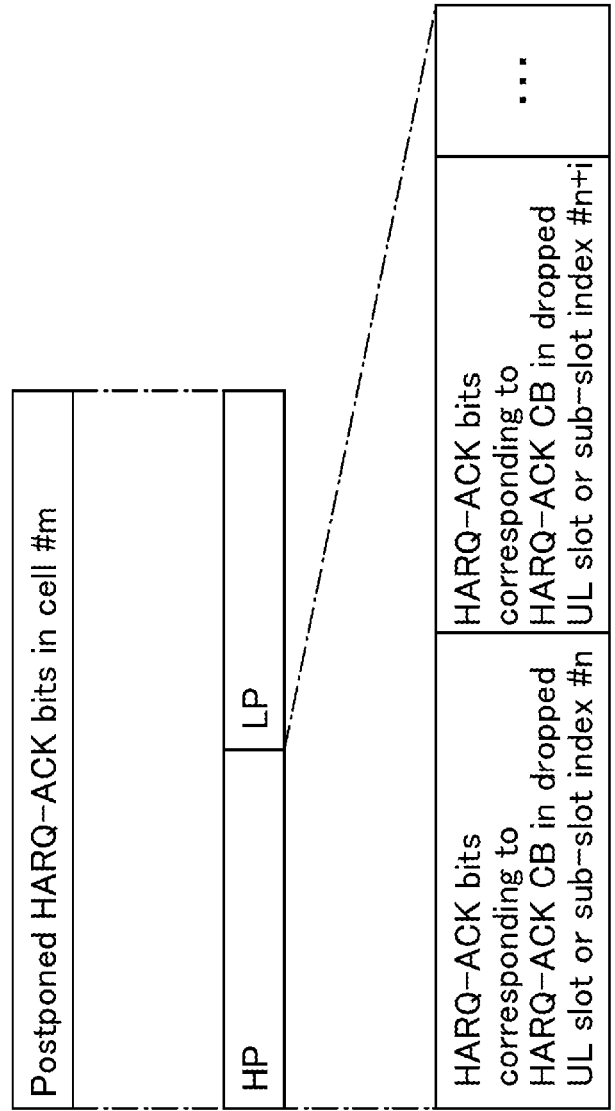
FIG. 17 is a drawing illustrating an example (6) of a HARQ-ACK CB in an embodiment of the present invention.

3) The order may be determined based on the permutations of two elements including {index of a UL slot or sub-slot in which the HARQ-ACK codebook is dropped} and {HARQ-ACK priority index}. In addition, in a UL slot or sub-slot, the configuration of the HARQ-ACK codebook corresponding to the SPS HARQ-ACK may be the same as that in release 15 or release 16. For example, the order of the index slot to be applied to the ordering may be {HARQ-ACK priority index} and {index of a UL slot or sub-slot in which the HARQ-ACK codebook is dropped}. FIG. 17 is a drawing illustrating an example (6) of a HARQ-ACK CB in an embodiment of the present invention. As illustrated in FIG. 17, for example, the order of the index set to be applied to the ordering may be {index of a UL slot or sub-slot in which the HARQ-ACK codebook is dropped} and {HARQ-ACK priority index}. Note that the index order in each of the index sets may be an ascending order or a descending order.

4) The order may be determined based on the permutations of two elements including {HARQ process ID} and {HARQ-ACK priority index}. For example, the order of the index set to be applied to the ordering may be {HARQ process ID} and {HARQ-ACK priority index}. Note that the index order in each of the index sets may be an ascending order or a descending order.

Note that, in the method of the order determination described in the above-described 1) to 4), {HARQ-ACK priority index} is not required to be considered. {HARQ-ACK priority index} may include two priorities.

Note that, in a case where the repeated transmission of SPS PDSCH is configured, the "SPS occasion slot index" in the above-described 1) may correspond to the DL slot or sub-slot including the last repetition of SPS PDSCH transmission. In addition, in a case where the repeated transmission of SPS PDSCH is configured, the "start symbol or end symbol" in the above-described 2) may correspond to the start symbol or end symbol in the last repetition of SPS PDSCH transmission.

In addition, as illustrated in FIG. 13, in a case where the postponed HARQ-ACK bits are added after the HARQ-ACK bits corresponding to the PDSCH occasion candidates for all of the serving cells, the order of the postponed HARQ-ACK bits may be determined by methods described in 1) to 8) below.

Figure 18:
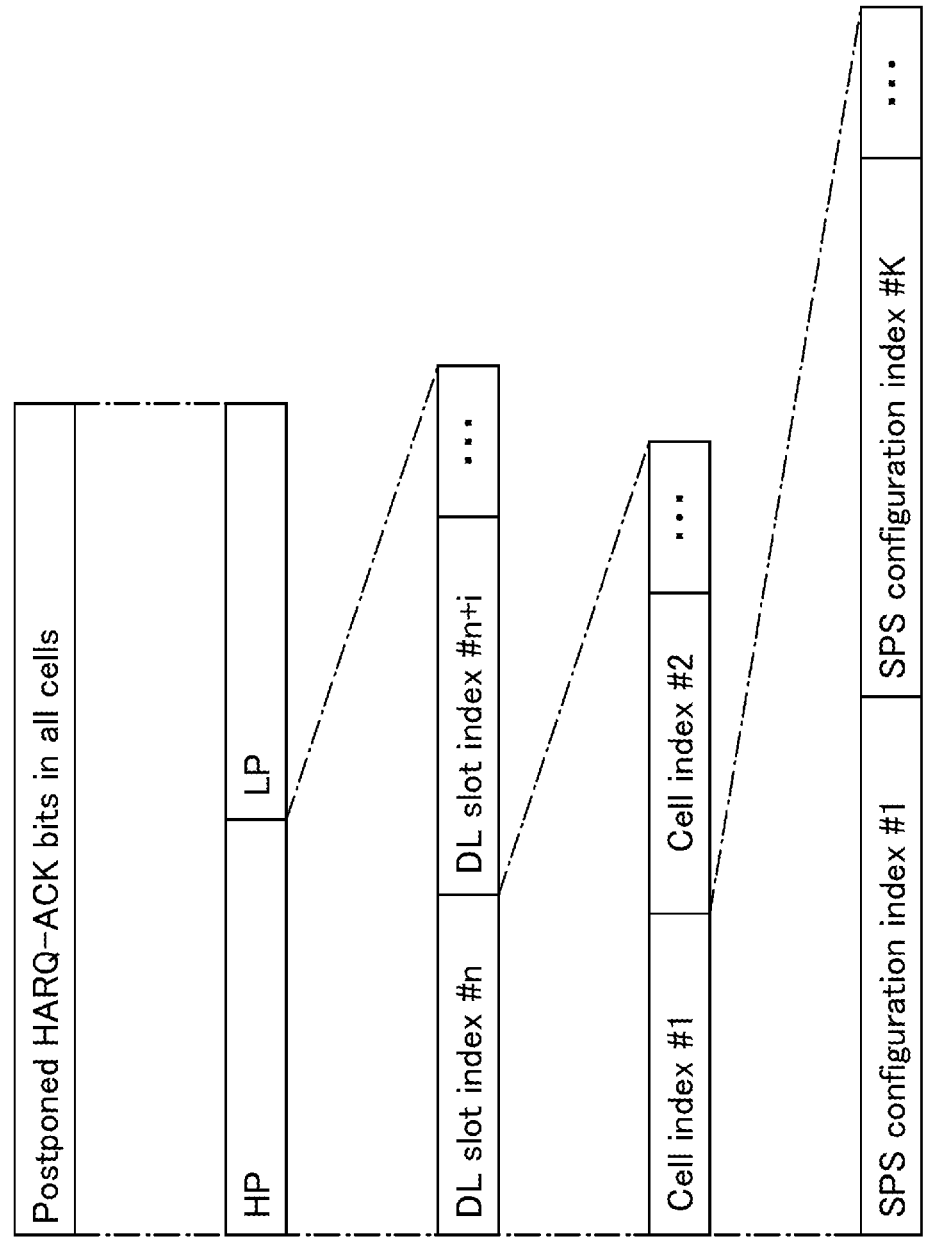
FIG. 18 is a drawing illustrating an example (7) of a HARQ-ACK CB in an embodiment of the present invention.

1) The order may be determined based on the permutations of four elements including {serving cell index}, {SPS configuration index}, {SPS occasion slot index}, and {HARQ-ACK priority index}. There are 24 permutations, and any permutation may be used. FIG. 18 is a drawing illustrating an example (7) of a HARQ-ACK CB in an embodiment of the present invention. For example, as illustrated in FIG. 18, the order of the HARQ-ACK bits may be determined by permutations of {SPS configuration index}, {serving cell index}, {SPS occasion slot index}, and {HARQ-ACK priority index}.

2) The order may be determined based on the permutations of three elements including {serving cell index}, {SPS configuration index}, and {SPS occasion slot index}. There are 6 permutations, and any permutation may be used.

Figure 19:
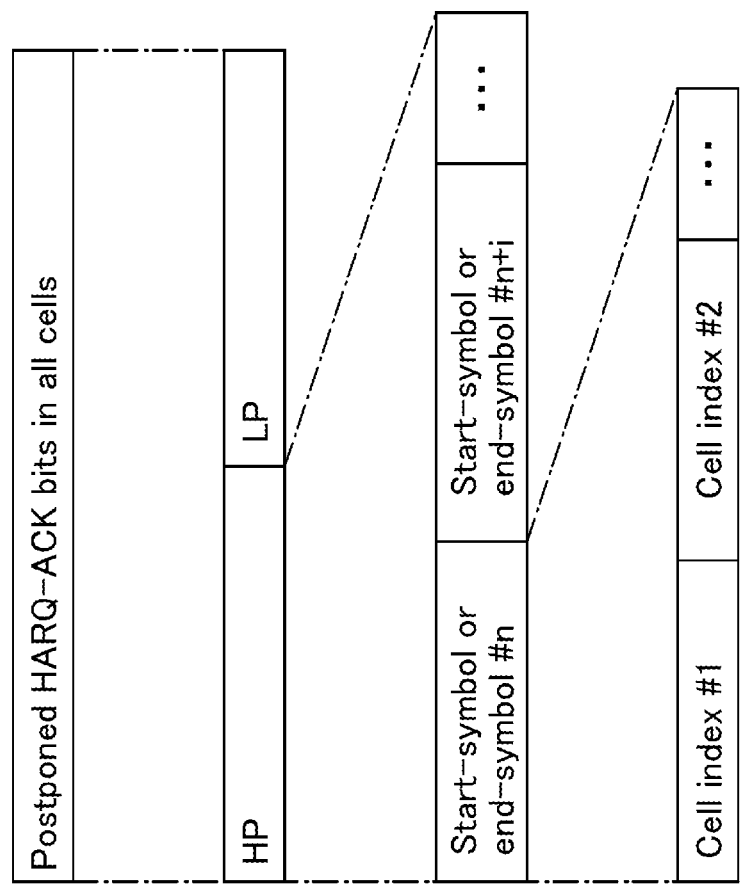
FIG. 19 is a drawing illustrating an example (8) of a HARQ-ACK CB in an embodiment of the present invention.

3) The order may be determined based on the permutations of three elements including {serving cell index}, {SPS PDSCH occasion start symbol or end symbol} and {HARQ-ACK priority index}. There are 6 permutations, and any permutation may be used. FIG. 19 is a drawing illustrating an example (8) of a HARQ-ACK CB in an embodiment of the present invention. For example, as illustrated in FIG. 19, the order of the HARQ-ACK bits may be determined by permutations of {serving cell index}, {SPS PDSCH occasion start symbol or end symbol}, and {HARQ-ACK priority index}.

4) The order may be determined based on the permutations of two elements including {serving cell index} and {SPS PDSCH occasion start symbol or end symbol}. There are 2 permutations, and any permutation may be used.

Figure 20:
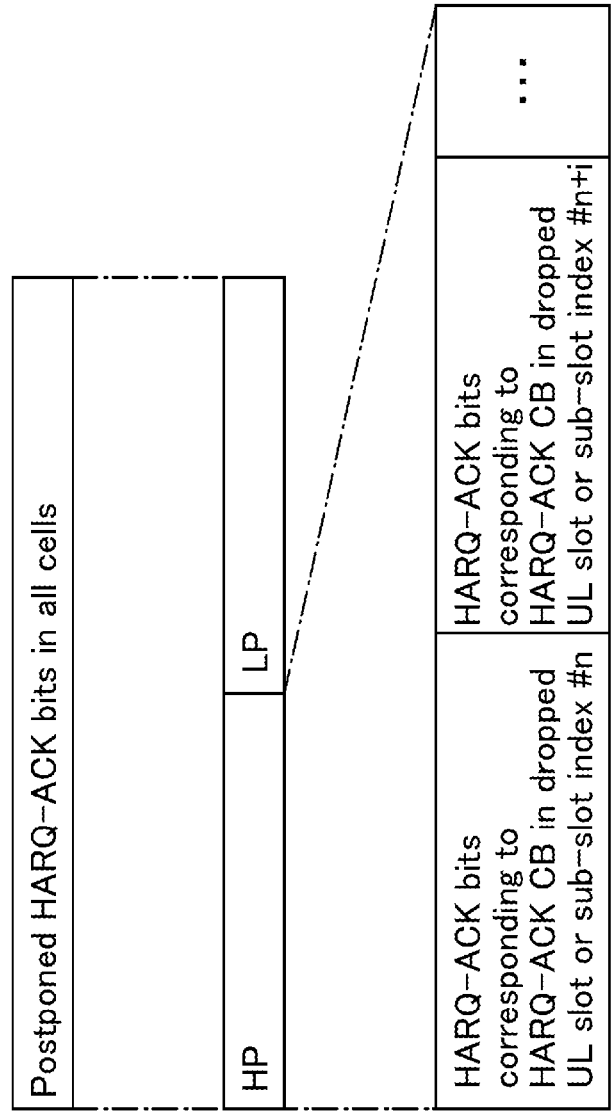
FIG. 20 is a drawing illustrating an example (9) of a HARQ-ACK CB in an embodiment of the present invention.

5) The order may be determined based on the permutations of three elements including {serving cell index}, {index of a UL slot or sub-slot in which the HARQ-ACK codebook is dropped}, and {HARQ-ACK priority index}. There are 6 permutations, and any permutation may be used. FIG. 20 is a drawing illustrating an example (9) of a HARQ-ACK CB in an embodiment of the present invention. For example, as illustrated in FIG. 20, the order of the HARQ-ACK bits may be determined by permutations of {SPS PDSCH occasion start symbol or end symbol}, and {HARQ-ACK priority index}. That is, {serving cell index} is not required to be considered.

6) The order may be determined based on the permutations of two elements including {serving cell index} and {index of a UL slot or sub-slot in which the HARQ-ACK codebook is dropped}. There are 2 permutations, and any permutation may be used.

7) The order may be determined based on the permutations of three elements including {serving cell index}, {HARQ process ID} and {HARQ-ACK priority index}. There are 6 permutations, and any permutation may be used.

8) The order may be determined based on the permutations of two elements including {serving cell index} and {HARQ process ID}. There are 2 permutations, and any permutation may be used.

Note that, in the method of the order determination described in the above-described 1), 3), 5), and 7), {HARQ-ACK priority index} is not required to be considered. {HARQ-ACK priority index} may include two priorities.

Note that, in a case where the repeated transmission of SPS PDSCH is configured, the "SPS occasion slot index" in the above-described 1) and 2) may correspond to the DL slot or sub-slot including the last repetition of SPS PDSCH transmission. In addition, in a case where the repeated transmission of SPS PDSCH is configured, the "start symbol or end symbol" in the above-described 2) may correspond to the start symbol or end symbol in the last repetition of SPS PDSCH transmission.

Hereinafter, an example of generating the type 2 HARQ-ACK codebook will be described. The HARQ-ACK bit order corresponding to the SPS PDSCH release with a separate or joint release DCI for a specific SPS configuration, may be determined by reusing the release 15 mechanism. For example, the HARQ-ACK bit order corresponding to the SPS PDSCH release may be determined based on DAI and K1 that is indicated by the release DCI.

In addition, the HARQ-ACK bit order corresponding to the SPS PDSCH associated with PDCCH may be determined by reusing the release 15 mechanism. For example, the HARQ-ACK bit order corresponding to the SPS PDSCH may be determined based on DAI and K1 that is indicated by the activation DCI.

In addition, the HARQ-ACK feedback for one or more SPS PDSCH receptions without corresponding PDCCH, may be multiplexed with the HARQ-ACK feedback for the dynamically scheduled PDSCH and/or for the SPS PDSCH release. In addition, the HARQ-ACK feedback bit for one or more SPS PDSCH receptions without corresponding PDCCH, may be added after the HARQ-ACK feedback for the dynamically scheduled PDSCH and/or for the SPS PDSCH release. The bit order may be determined in the order of ascending order of DL slot index, ascending order of SPS configuration index, and ascending order of serving cell index.

The method of configuring the type 2 HARQ-ACK codebook in the above-described step S205 will be described below.

In a case where there are only postponed SPS HARQ-ACK bits in a slot or sub-slot, that is, in a case where there is no non-postponed SPS HARQ-ACK bit and no dynamic HARQ-ACK bit in the slot, the order of the postponed HARQ-ACK bits may be the order of a case in which the postponed HARQ-ACK bits are added after the HARQ-ACK bits corresponding to the PDSCH occasion candidates in all of the serving cells as illustrated in the above-described FIG. 13.

In addition, in a case where there are postponed SPS HARQ-ACK bits, non-postponed SPS HARQ-ACK bits, and dynamic HARQ-ACK bits in a slot or sub-slot, or, in a case where there are postponed SPS HARQ-ACK bits and non-postponed SPS HARQ-ACK bits, the postponed HARQ-ACK bits may be added after the HARQ-ACK bits corresponding to the non-postponed SPS HARQ-ACK bits and/or the dynamic HARQ-ACK bits for each of the serving cells, or, the postponed HARQ-ACK bits may be added after the HARQ-ACK bits corresponding to the non-postponed SPS HARQ-ACK bits and/or the dynamic HARQ-ACK bits for all of the serving cells.

In addition, in a case where there are postponed SPS HARQ-ACK bits, non-postponed SPS HARQ-ACK bits, and dynamic HARQ-ACK bits in a slot or sub-slot, or, in a case where there are postponed SPS HARQ-ACK bits and non-postponed SPS HARQ-ACK bits, the postponed SPS HARQ-ACK bits, the non-postponed SPS HARQ-ACK bits, and the dynamic HARQ-ACK bits may be ordered together, or may be applied to the same rule as release 16. That is, the postponed SPS HARQ-ACK bits, the non-postponed SPS HARQ-ACK bits, and the dynamic HARQ-ACK bits may be treated in the same way in the determination of the bit order of the type 2 HARQ-ACK codebook.

In addition, in a case where there are postponed SPS HARQ-ACK bits, dynamic HARQ-ACK bits, and no non-postponed SPS HARQ-ACK bits in a slot or sub-slot, the postponed HARQ-ACK bits may be added after the HARQ-ACK bits corresponding to the dynamic HARQ-ACK bits for each of the serving cells, or, the postponed HARQ-ACK bits may be added after the HARQ-ACK bits corresponding to the dynamic HARQ-ACK bits for all of the serving cells. As illustrated in FIG. 13, the order of the postponed HARQ-ACK bits may be an order of a case in which the postponed HARQ-ACK bits are added after the HARQ-ACK bits corresponding to PDSCH occasion candidates in all of the serving cells.

In an embodiment of the present invention, which operation or method is to be used may be configured by an upper layer parameter, may be determined based on the UE capability reported by the terminal 20, may be defined in advance by the specifications, or may be determined by the upper layer parameter and the UE capability.

Hereinafter, the UE capabilities described in 1) to 5) may be defined.

1) UE capability indicating whether to support a function of avoiding the dropping of SPS HARQ-ACK due to the collision between at least one "DL symbol or F symbol" and the PUCCH resource in a case of TDD method.
2) UE capability indicating whether to support HARQ-ACK postponement in a case of TDD method.
3) UE capability indicating whether to support configuration of the type 1 HARQ-ACK codebook corresponding to the HARQ-ACK postponement.
4) UE capability indicating whether to support configuration of the type 2 HARQ-ACK codebook corresponding to the HARQ-ACK postponement.
5) UE capability indicating whether to support DCI or RRC signaling indicating the upper limit number of the postponed HARQ-ACK bits.

(Apparatus Configuration)

Next, a functional configuration example of the base station 10 and the terminal 20 for performing the processes and operations described above will be described. The base station 10 and terminal 20 include functions for implementing the embodiments described above. It should be noted, however, that each of the base station 10 and the terminal 20 may include only one of the functions in an embodiment of the present invention.

<Base Station 10>

Figure 21:
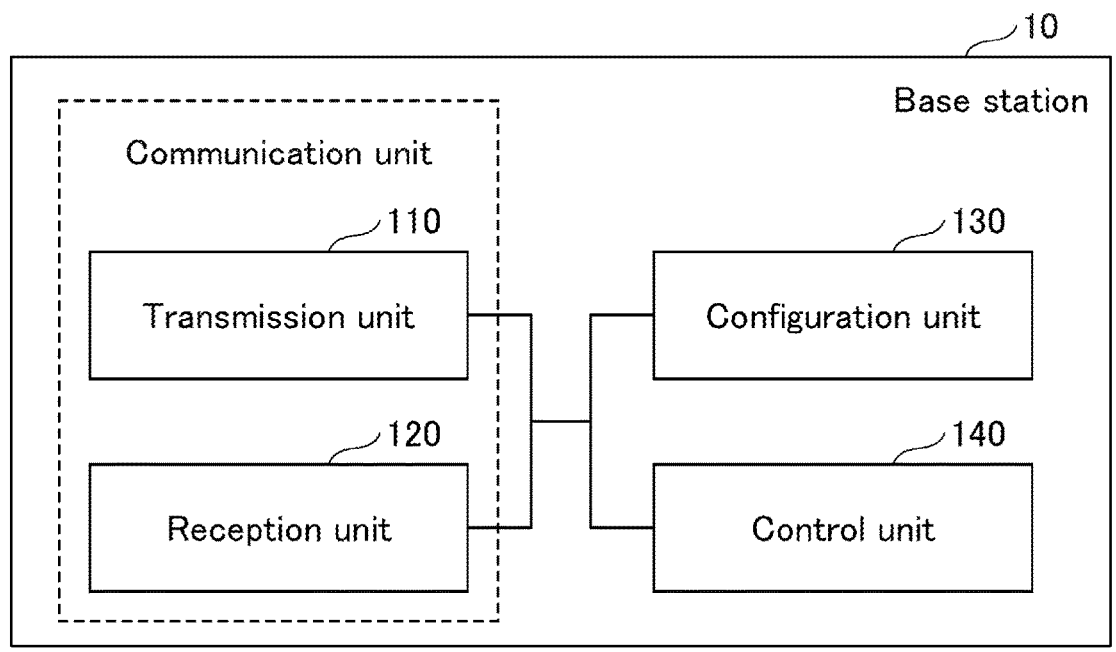
FIG. 21 is a drawing illustrating an example of a functional structure of a base station 10 in an embodiment of the present invention.

FIG. 21 is a diagram illustrating an example of a functional configuration of the base station 10. As shown in FIG. 21, the base station 10 includes a transmission unit 110, a reception unit 120, a configuration unit 130, and a control unit 140. The functional structure illustrated in FIG. 21 is merely an example. Functional divisions and names of functional units may be anything as long as operations according to an embodiment of the present invention can be performed. The transmission unit 110 and the reception unit 120 may be referred to as a communication unit.

The transmission unit 110 includes a function for generating a signal to be transmitted to the terminal 20 side and transmitting the signal wirelessly. The reception unit 120 includes a function for receiving various signals transmitted from the terminal 20 and acquiring, for example, information of a higher layer from the received signals. Further, the transmission unit 110 has a function of transmitting NR-PSS, NR-SSS, NR-PBCH, DL/UL control signals, the DL data, and the like, to the terminal 20. In addition, the transmission unit 110 transmits configuration information, or the like, described in the embodiment.

The configuration unit 130 stores preset configuration information and various configuration information items to be transmitted to the terminal 20 in a storage apparatus and reads the preset configuration information from the storage apparatus if necessary. The control unit 140 performs, for example, resource allocation and control of the entire base station 10. Note the functional unit related to signal transmission in the control unit 140 may be included in the transmission unit 110, and the functional unit related to signal reception in the control unit 140 may be included in the reception unit 120. Further, the transmission unit 110 and the reception unit 120 may be referred to as a transmitter and a receiver, respectively.

<Terminal 20>

Figure 22:
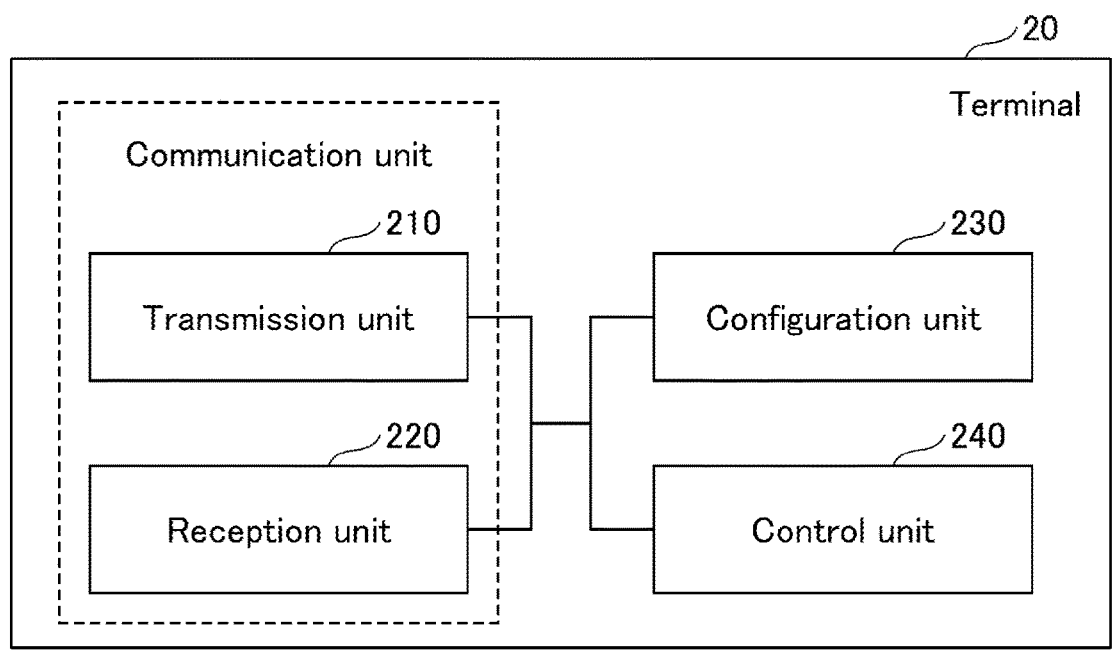
FIG. 22 is a drawing illustrating an example of a functional structure of a terminal 20 in an embodiment of the present invention.

FIG. 22 is a diagram illustrating an example of a functional configuration of the terminal 20. As shown in FIG. 22, the terminal 20 includes a transmission unit 210, a reception unit 220, a configuration unit 230, and a control unit 240. The functional structure illustrated in FIG. 22 is merely an example. Functional divisions and names of functional units may be anything as long as operations according to an embodiment of the present invention can be performed. The transmission unit 210 and the reception unit 220 may be referred to as a communication unit.

The transmission unit 210 generates a transmission signal from transmission data and transmits the transmission signal wirelessly. The reception unit 220 receives various signals wirelessly and obtains upper layer signals from the received physical layer signals. In addition, the transmission unit 210 transmits a HARQ-ACK, and the reception unit 220 receives configuration information described in the embodiment.

The configuration unit 230 stores, in a storage device, various configuration information items received from the base station 10 via the reception unit 220, and reads them from the storage device if necessary. In addition, the configuration unit 230 also stores pre-configured configuration information. The control unit 240 controls the entire terminal 20. Note the functional unit related to signal transmission in the control unit 240 may be included in the transmission unit 210, and the functional unit related to signal reception in the control unit 240 may be included in the reception unit 220. Further, the transmission unit 210 and the reception unit 220 may be referred to as a transmitter and a receiver, respectively.

Embodiment Summary

As described above, according to an embodiment of the present invention, a terminal is provided. The terminal includes: a reception unit configured to receive data according to SPS (Semi persistent scheduling) from a base station; a control unit configured to determine HARQ-ACK (Hybrid automatic repeat request Acknowledgement) feedback information corresponding to the data, wherein transmission of the HARQ-ACK feedback information is required to be postponed until a valid uplink resource is found, configure a HARQ-ACK codebook related to the feedback information, and determine bits of the feedback information by applying the codebook; and a transmission unit configured to transmit the feedback information to the base station. The control unit configures the codebook based on priorities configured to the bits.

According to the above configuration, the terminal 20 can postpone the resource for transmitting HARQ-ACK corresponding to SPS until a valid UL resource is found, configure a priority-considered HARQ-ACK codebook, and transmit HARQ-ACK feedback information to the base station 10. That is, the terminal that has received data from a base station can transmit feedback information corresponding to the data reception to the base station.

The control unit may configure the codebook for each of the priorities, or may configure the codebook common to the different priorities. According to the above configuration, the terminal 20 can configure the codebook corresponding to the postponed SPS HARQ-ACK by considering the priorities.

The control unit may enhance a HARQ-ACK window corresponding to the codebook and including the data corresponding to the feedback information. According to the above configuration, the terminal 20 can configure the codebook corresponding to the postponed SPS HARQ-ACK.

The control unit may configure the codebook by adding bits corresponding to data, wherein transmission of the data is required to be postponed until a valid uplink resource is found, after bits corresponding to data, wherein transmission of the data is not required to be postponed until a valid uplink resource is found. According to the above configuration, the terminal 20 can configure the codebook corresponding to the postponed SPS HARQ-ACK.

As described above, according to an embodiment of the present invention, a base station is provided. The base station includes: a transmission unit configured to transmit data according to SPS (Semi persistent scheduling) to a terminal; a control unit configured to determine HARQ-ACK (Hybrid automatic repeat request Acknowledgement) feedback information corresponding to the data, wherein transmission of the HARQ-ACK feedback information is required to be postponed until a valid uplink resource is found, configure a HARQ-ACK codebook related to the feedback information, and determine bits of the feedback information by applying the codebook; and a reception unit configured to receive the feedback information from the terminal. The control unit configures the codebook based on priorities configured to the bits.

According to the above configuration, the terminal 20 can postpone the resource for transmitting HARQ-ACK corresponding to SPS until a valid UL resource is found, configure a priority-considered HARQ-ACK codebook, and transmit HARQ-ACK feedback information to the base station 10. That is, the terminal that has received data from a base station can transmit feedback information corresponding to the data reception to the base station.

In addition, according to an embodiment of the present invention, a communication method performed by a terminal is provided. The communication method includes: receiving data according to SPS (Semi persistent scheduling) from a base station; determining HARQ-ACK (Hybrid automatic repeat request Acknowledgement) feedback information corresponding to the data, wherein transmission of the HARQ-ACK feedback information is required to be postponed until a valid uplink resource is found, configuring a HARQ-ACK codebook related to the feedback information; determining bits of the feedback information by applying the codebook; transmitting the feedback information to the base station; and configuring the codebook based on priorities configured to the bits.

According to the above configuration, the terminal 20 can postpone the resource for transmitting HARQ-ACK corresponding to SPS until a valid UL resource is found, configure a priority-considered HARQ-ACK codebook, and transmit HARQ-ACK feedback information to the base station 10. That is, the terminal that has received data from a base station can transmit feedback information corresponding to the data reception to the base station.

(Hardware Structure)

In the above functional structure diagrams used for describing an embodiment of the present invention (FIG. 21 and FIG. 22), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming, broadcasting, notifying, communicating, forwarding, configuring, reconfiguring, allocating, mapping, and assigning, etc. For example, a functional block (component) that functions to perform transmission is called a transmitting unit or a transmitter. In either case, as described above, the implementation method is not particularly limited.

Figure 23:
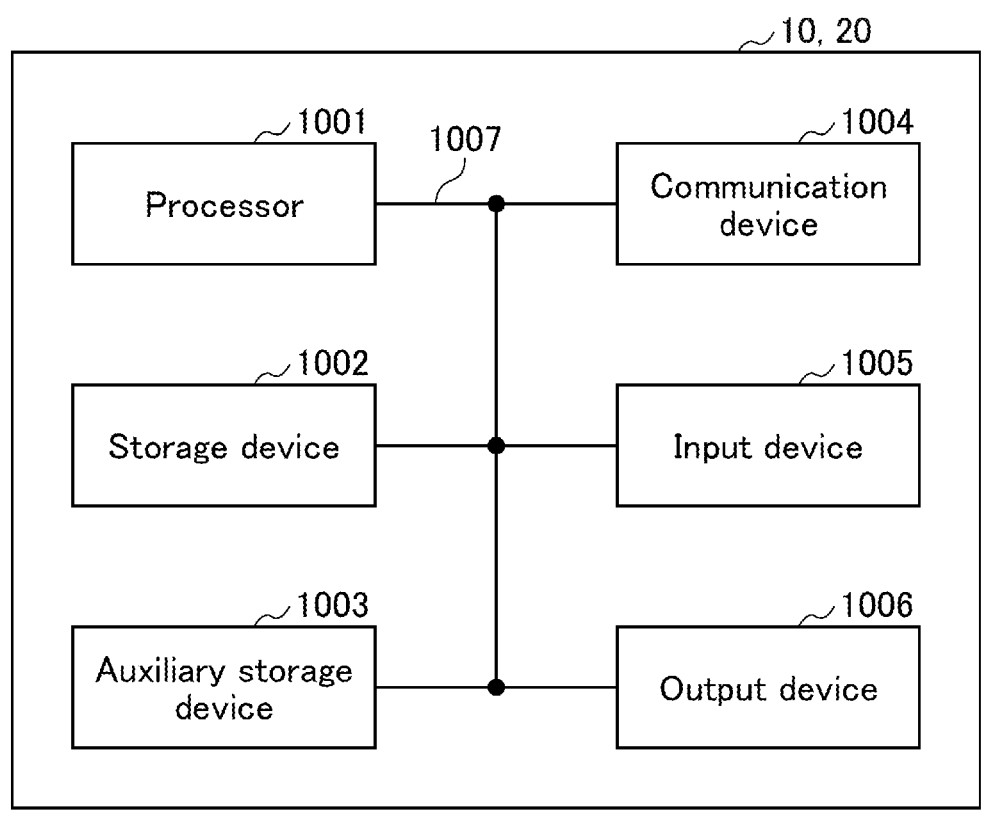
FIG. 23 is a drawing illustrating an example of a hardware structure of the base station 10 or the terminal 20 in an embodiment of the present invention.

For example, the base station 10, terminal 20, etc., according to an embodiment of the present disclosure may function as a computer for processing the radio communication method of the present disclosure. FIG. 23 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 21 may be realized by control programs that are stored in the storage device 1002 and are executed by the processor 1001. Further, for example, the control unit 240 of the terminal 20 illustrated in FIG. 22 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may include a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and the terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may be represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "base on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts," "circuits," "devices," etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain (OFDM (Orthogonal Frequency Division Multiplexing) symbols, SC-FDMA (Single Carrier Frequency Division Multiple Access) symbols, and the like). The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.,) may be replaced with a TTI having a time length exceeding 1 ms, and the short TTI (e.g., shortened TTI, etc.,) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in a RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), subcarrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a terminal 20, one or more BWPs may be configured in one carrier.

At least one of the configured BWPs may be activated, and the terminal 20 may assume that the terminal 20 will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in a RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

Each aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device 1005 Input device
1006 Output device

The invention claimed is:

1. A terminal comprising:
a reception unit configured to receive data according to SPS (Semi persistent scheduling) from a base station;
a control unit configured to determine whether or not transmission of HARQ-ACK (Hybrid automatic repeat request Acknowledgement) feedback information corresponding to the data is to be postponed for each of configurations of the SPS and, in a case where transmission of each of a plurality of HARQ-ACK feedback information items corresponding to a plurality of the configurations of the SPS is determined to be postponed, determine a postponed timing for transmitting the plurality of HARQ-ACK feedback information items via an uplink (UL) channel, based on a priority of each of the plurality of HARQ-ACK feedback information items; and
a transmission unit configured to transmit the HARQ-ACK feedback information to the base station at the postponed timing.

2. The terminal as claimed in claim 1, wherein the control unit adds bits of the plurality of HARQ-ACK feedback information items to an end of a HARQ-ACK codebook that is to be transmitted at the postponed timing.

3. The terminal as claimed in claim 2, wherein the control unit determines an order of the bits of the HARQ-ACK feedback information items, corresponding to the data, that are added to the HARQ-ACK codebook, based on a serving cell index, an SPS configuration index, and an SPS slot index.

4. The terminal as claimed in claim 1, wherein the control unit determines an order of the bits of the HARQ-ACK feedback information items, corresponding to the data, that are added to the HARQ-ACK codebook, based on a serving cell index, an SPS configuration index, and an SPS slot index.

5. A wireless communication system comprising: a terminal; and a base station, wherein
the terminal includes:
a reception unit configured to receive data according to SPS (Semi persistent scheduling) from a base station;
a control unit configured to determine whether or not transmission of HARQ-ACK (Hybrid automatic repeat request Acknowledgement) feedback information corresponding to the data is to be postponed for each of configurations of the SPS, and, in a case where transmission of each of a plurality of HARQ-ACK feedback information items corresponding to a plurality of the configurations of the SPS is determined to be postponed, determine a postponed timing for transmitting the plurality of HARQ-ACK feedback information items via an uplink (UL) channel, based on a priority of each of the plurality of HARQ-ACK feedback information items; and
a transmission unit configured to transmit the HARQ-ACK feedback information to the base station at the postponed timing, and
the base station includes:
a transmission unit configured to transmit data according to SPS (Semi persistent scheduling) to the terminal; and
a reception unit configured to receive the HARQ-ACK feedback information from the terminal.

6. A communication method performed by a terminal, the communication method comprising:
receiving data according to SPS (Semi persistent scheduling) from a base station;
determining whether or not transmission of HARQ-ACK (Hybrid automatic repeat request Acknowledgement) feedback information corresponding to the data is to be postponed for each of configurations of the SPS and, in a case where transmission of each of a plurality of HARQ-ACK feedback information items corresponding to a plurality of the configurations of the SPS is determined to be postponed, determining a postponed timing for transmitting the plurality of HARQ-ACK feedback information items via an uplink (UL) channel, based on a priority of each of the plurality of HARQ-ACK feedback information items; and
transmitting the HARQ-ACK feedback information to the base station at the postponed timing.

* * * * *